INVENTORS
WERNER W. EIBE &
RICHARD W. TEPEL
BY
ATTORNEY

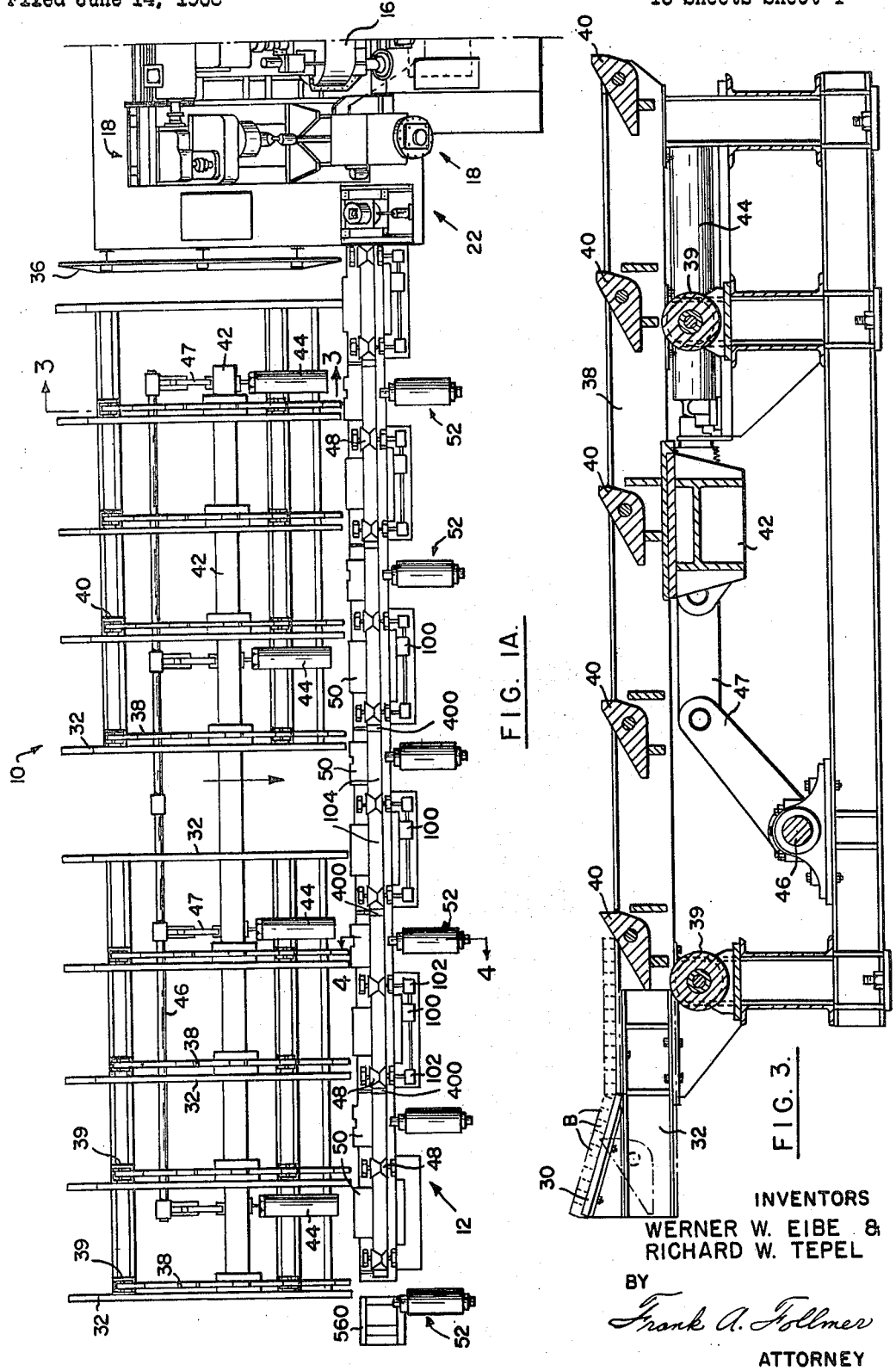

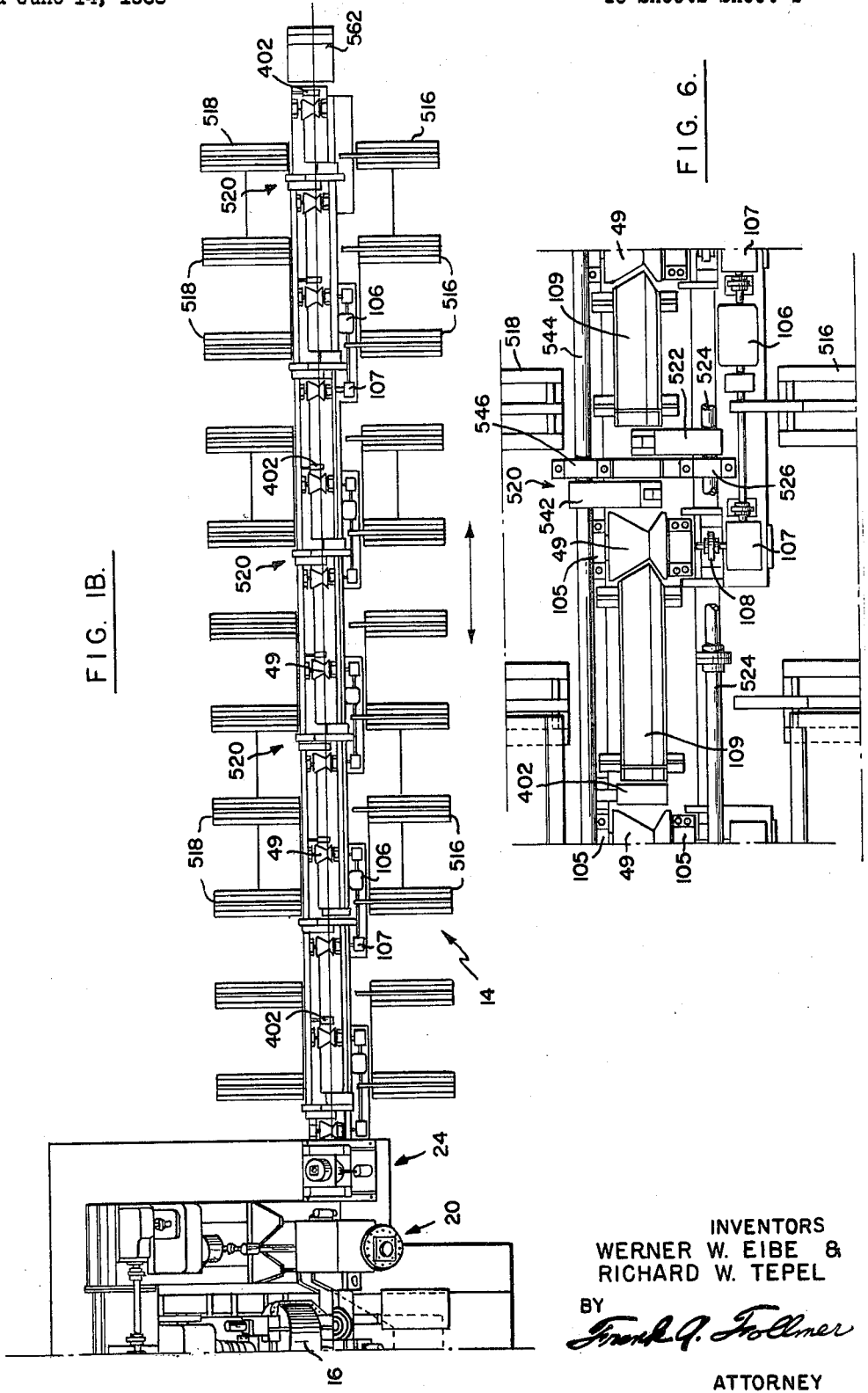

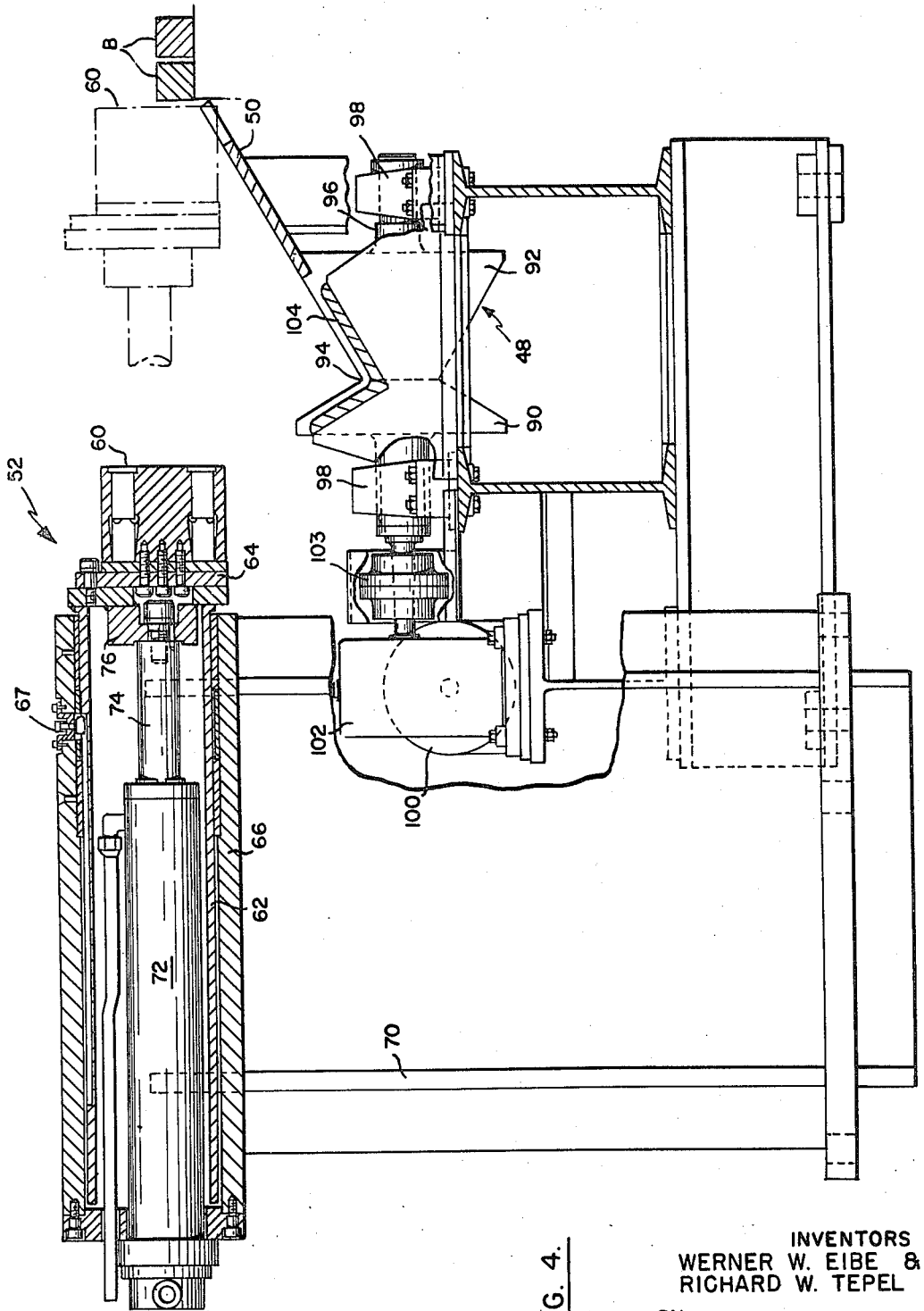

Feb. 24, 1970   W. W. EIBE ET AL   3,496,831
BILLET CHIPPER

Filed June 14, 1968   13 Sheets-Sheet 5

INVENTORS
WERNER W. EIBE &
RICHARD W. TEPEL
BY
*Frank A. Follmer*
ATTORNEY

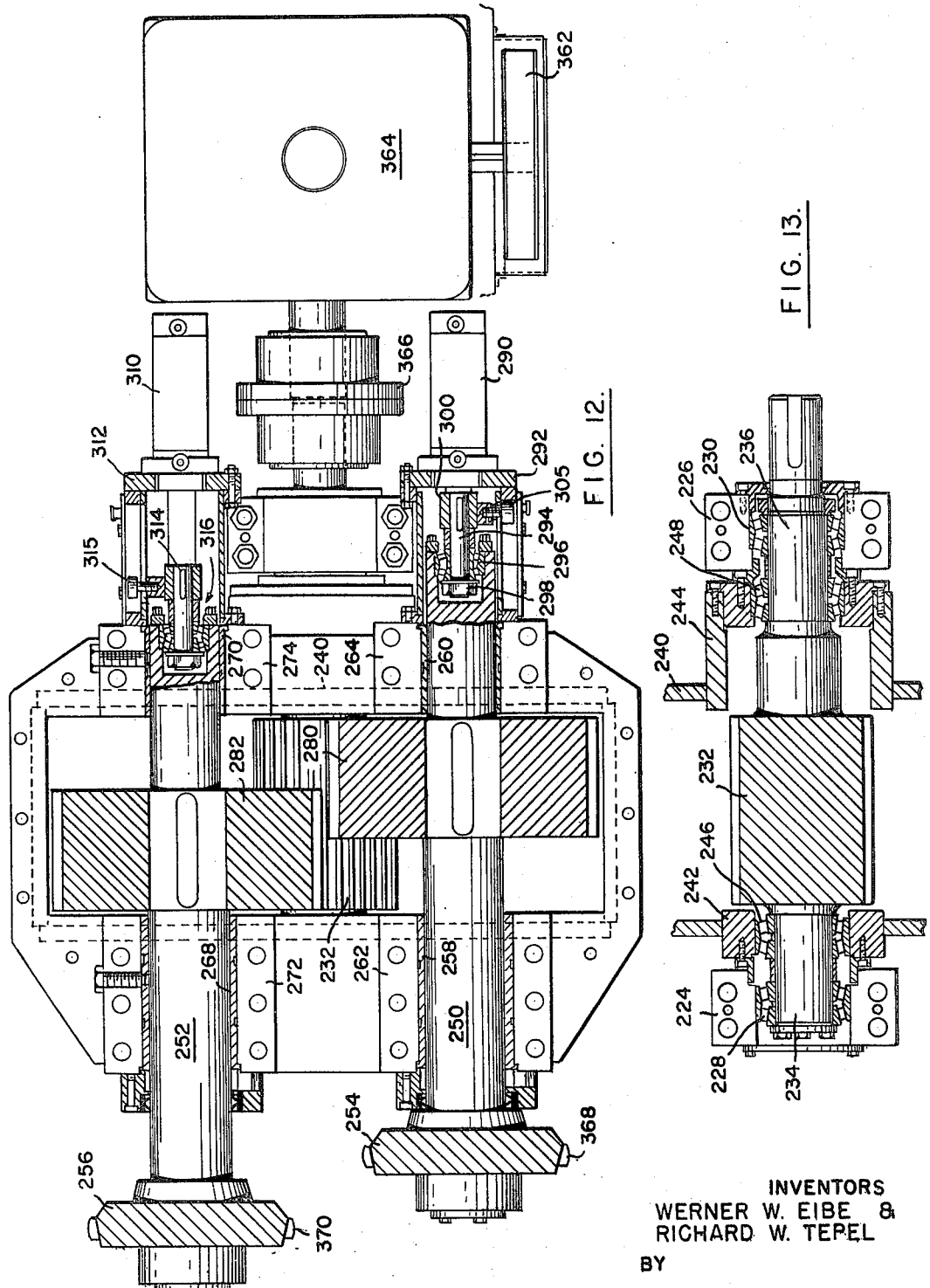

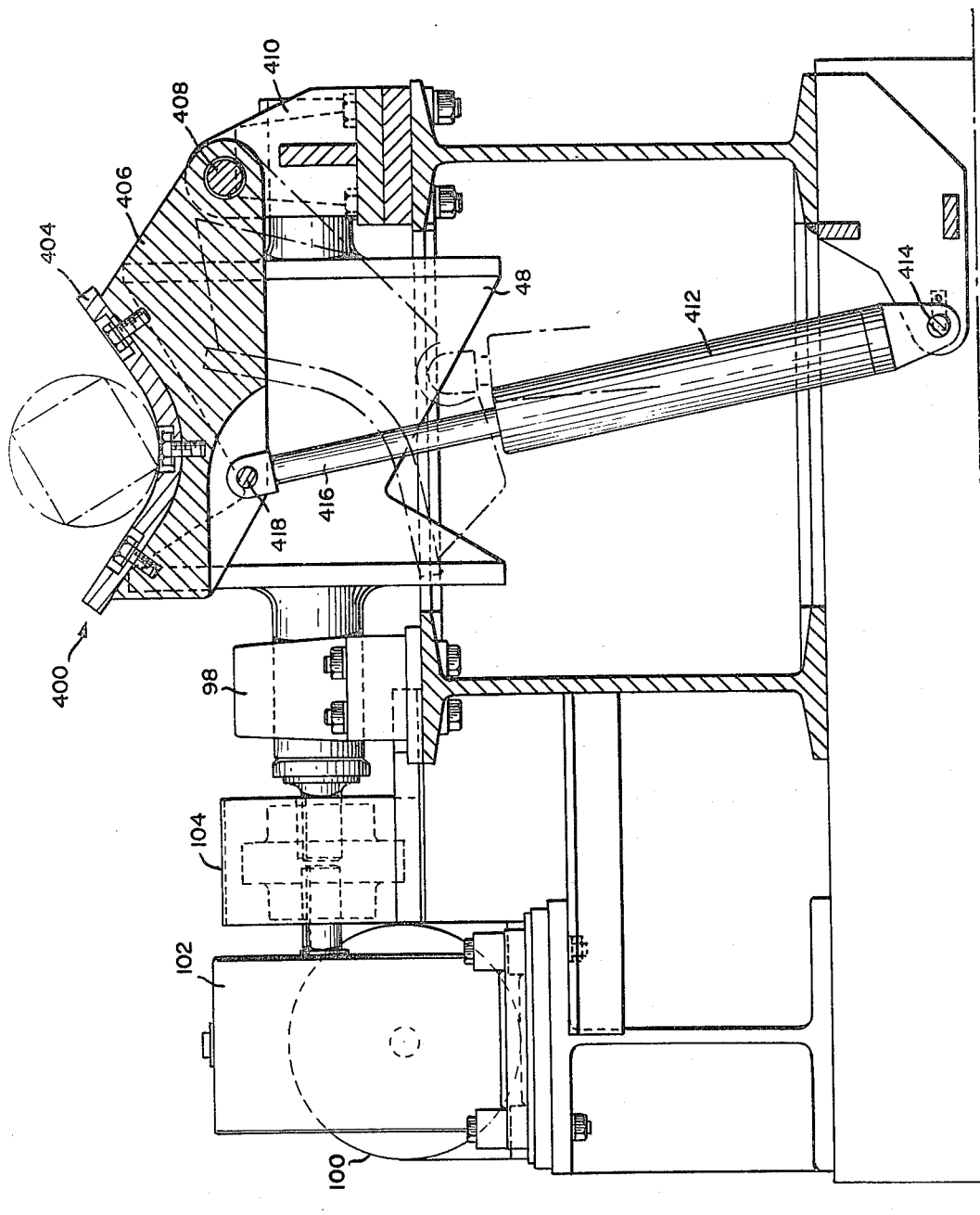

Feb. 24, 1970 W. W. EIBE ET AL 3,496,831
BILLET CHIPPER
Filed June 14, 1968 13 Sheets-Sheet 12
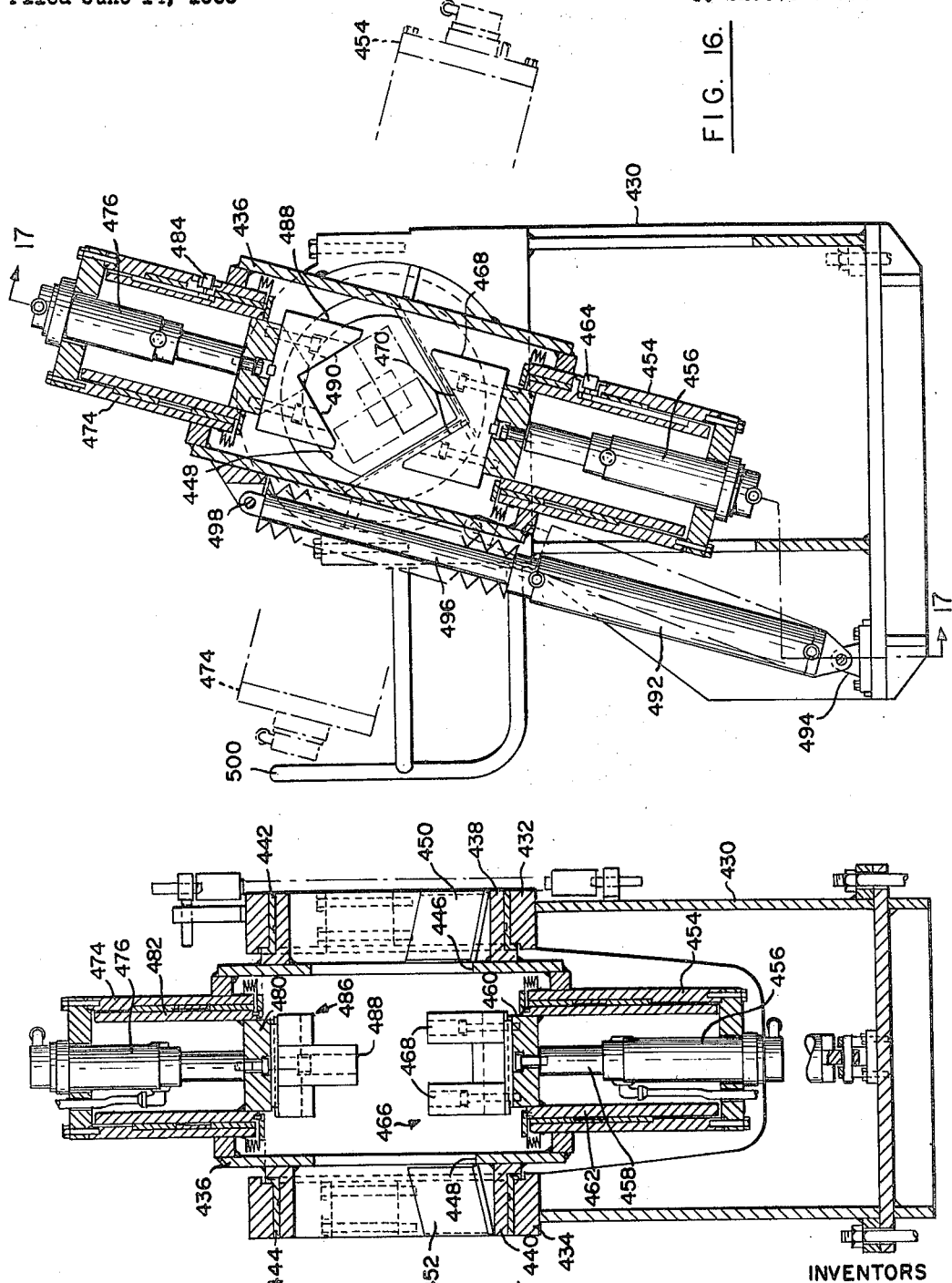
INVENTORS
WERNER W. EIBE &
RICHARD W. TEPEL
BY
Frank A. Follmer
ATTORNEY

United States Patent Office 3,496,831
Patented Feb. 24, 1970

3,496,831
BILLET CHIPPER
Werner W. Eibe and Richard W. Tepel, Allegheny County, Pa., assignors to Blaw-Knox Company, Pittsburgh, Pa., a corporation of Delaware
Filed June 14, 1968, Ser. No. 737,042
Int. Cl. B23c 9/00, 7/00, 1/00
U.S. Cl. 90—21                             16 Claims

ABSTRACT OF THE DISCLOSURE

A billet chipper having a pair of rotating cutting heads arranged to be selectively moved into a working position for removing defects from a billet moved past a chipping station. One of the cutting heads is adapted to remove defects from the billet as the billet is moved in one direction past the chipping station and the other of the cutting heads is adapted to remove defects from the billet as it is moved in the opposite direction past the chipping station. The billet chipper is also provided with mechanism for clamping the billet securely during chipping so as to prevent vibration thereof as a result of the forces developed by the cutting heads.

BACKGROUND OF THE INVENTION

The invention relates to a machine known in the art as a billet chipper. The billets produced by continuous casting machines and billet mills generally have small cracks or defects on their surfaces. These cracks must be removed before the billets are delivered to the finishing mills so that these imperfections will not appear in the final product. The billet chipper is a machine for removing these cracks or defects from the billet.

Originally, the removal of the cracks or defects on the surfaces of billets by a cutting tool, which procedure is known in the art as "chipping," was performed manually by means of various hand operated tools. The art then advanced to the use of machines in the general nature of a planer, there being provided in this machine a rotating cutter for use in the chipping of the cracks from the billet. However, these prior machines had several disadvantages. Firstly, since a rotating cutter of the type adapted to remove defects could only function properly with the billet moving in one direction relative thereto, it was necessary to return the billet past the chipping station after each chipping operation. During this return movement, no productive work could be performed on the billet wherefore both the operator of the machine and the machine itself were unproductive.

Another problem associated with prior art billet chippers results because many billets as they are delivered to the chipper are not straight and, in fact, may often have a substantial twist and curvature. Accordingly, a problem encountered is that of holding the curved billet securely at the chipping station so as to secure it against deflection or vibration during the chipping operation.

Other problems involved in the design of billet chippers relate to the provision of equipment for handling these billets, which are very long and have the distorted shape as mentioned above. Illustrative of such handling equipment are the means for delivering billets to the feed tables of the chipper, the means for feeding the billets past the chipping station, the means for turning them to present their desired sides in position to be worked on by the cutting heads, and the mechanism for removing the billets after completion of the chipping operation.

SUMMARY OF THE INVENTION

Briefly stated, the billet chipper in accordance with this invention overcomes the above discussed problems of prior machines by providing in combination novel billet handling and chipping mechanisms. The problem resulting from the wasted return time of the billet is obviated by the provision of chipping mechanism comprising a pair of rotating cutter heads mounted so that, by selection, either one may be moved into an operating position. The cutter heads are arranged so that one is adapted, when rotating in a predetermined direction, to remove material from a billet moving past the chipping station in one direction, and the other cutter head is adapted, when rotating in its predetermined direction, to remove material from the billet when it moves past the chipping station in the opposite direction. Accordingly, the operator of the machine moves one of the cutter heads into operative position when the billet is moved in one direction past the chipping station, and moves the other of the cutting heads into operative position when the billet is moved in the opposite direction past the chipping station. By this arrangement, the billet may be worked on during each movement past the chipping station and there is no wasted motion of the billet. Thus, whereas with the prior machines it was necessary to move a rectangular billet as many as eight times past the chipping station, with the mechanism of the present invention this movement can be reduced to four passes across the chipping station, since either one of the cutter heads can be operable to chip a side of the billet. Moreover, by reason of the use of a pair of cutter heads, the intervals between each "down time" of the machine for replacement of worn cutting elements can be reduced.

The problems of vibration and shock during a cutting or chipping operation are obviated by the provision of a plurality of pairs of guide rollers and at least one clamping roller which is pressed against the billet to clamp the same with such considerable force that the forces developed in cutting can not deflect or vibrate the billet. Thus, even though the billet may have an appreciable curvature, by placing this billet under the tight grasp supplied by the rollers, the potential forces produced by the cutting tool are prevented from causing vibration or deflection of the billet and therefore shock is substantially eliminated.

There are further provided novel means for turning the billet in any position relative to the billet chipper, and this turning can be achieved rapidly and dependably. This arrangement also gives the operator great versatility in the manipulation of the billet to keep to a minimum the amount of movement of the billet relative to the chipping station. For example, if a billet has cracks on two adjacent sides but limited to only one region along its length, it is possible for the operator to limit the chipping operations to this region without the necessity of running the billet completely past the chipping station before it can be turned.

The invention also involves the provision of novel billet handling mechanisms for dispensing a billet from a supply or feed table onto the billet input table. Such means involves a plurality of magnetic arms for engaging one billet at a time, and transferring it from a supply table to a chipper input table.

There is also involved in the present invention means for removing billets from the tables of the billet chipper upon a completion of the billet chipping operation. Such means involves a kick-off construction involving simplicity of construction and operation.

BRIEF DESCRIPTION OF THE DRAWINGS

FIGURES 1A and 1B are plan views of adjacent portions of the billet chipper in accordance with the invention;

FIGURE 3 is a sectional view taken on line 3—3 of FIGURE 1A and illustrating the billet feed table;

FIGURE 4 is a sectional view taken on line 4—4 of FIGURE 1A;

FIGURE 6 is an enlarged plan view of a portion of the output table of the billet chipper;

FIGURE 12 is a view of the chipper head taken on line 12—12 of FIGURE 9;

FIGURE 13 is a sectional view taken on line 13—13 of FIGURE 9;

FIGURE 15 is a sectional view of the billet elevator means;

FIGURE 16 is a sectional view illustrating the turner assembly of the billet chipper;

FIGURE 17 is a sectional view taken on line 17—17 of FIGURE 16; and

DESCRIPTION OF THE PREFERRED EMBODIMENT

Figure 2:
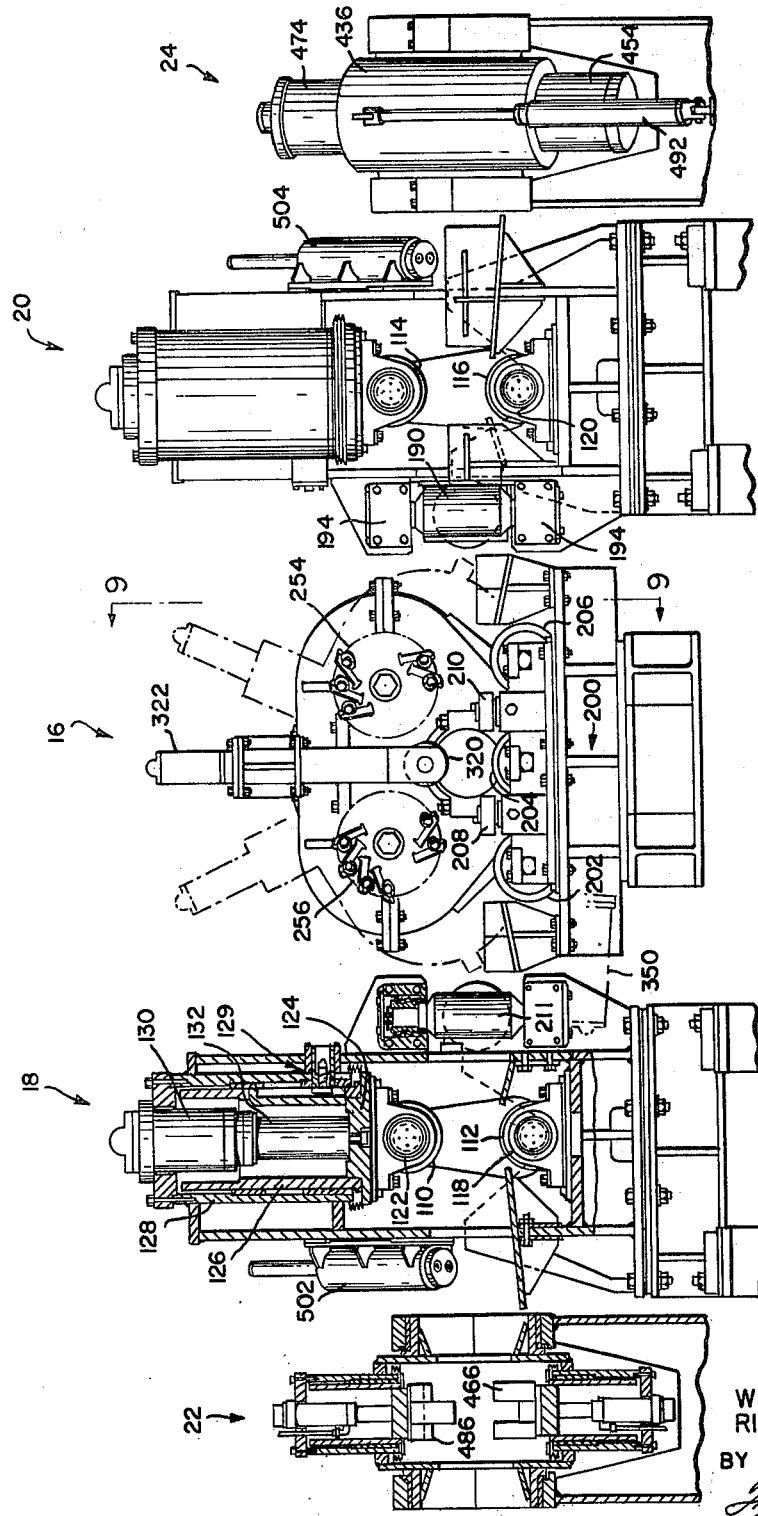
FIGURE 2 is a front view of the parts of the billet chipper in the region of the chipping station.

While the billet chipper will be described with reference to its use with a billet having a square cross-section, the billet chipper in accordance with the broader aspects of the invention is adaptable for use with billets having round, square or rectangular cross-sections. Also, while the billets are generally very long, such as about 60 feet, it will be apparent that the billet chipper is capable of handling billets of various lengths.

The general arrangement of the billet chipper in accordance with the invention is shown in FIGURES 1A and 1B wherein there is shown a billet supply or feed table 10 adjacent an input table 12 extending along one side of the machine. On the other side of the machine there is provided an output table 14. Between the input and output tables there is a chipper assembly 16, a pair of feed roll assemblies 18 and 20 and a pair of billet turners 22 and 24, these mechanisms being shown in more detail in FIGURE 2.

The billets B are delivered to the supply or feed table 10 by suitable handling equipment after they have been provided with markings visible to the operator of the billet chipper and indicative of the billet surface cracks or defects which are to be removed. While billets can be delivered anywhere onto the feed table 10, they are generally delivered to an inclined platform 30 at the receiving end of the feed table 10. The feed table 10 is constructed of a suitable framework comprising a plurality of parallel, spaced billet supporting members 32 which extend in the direction of feed of the billets. The billets are arranged in rows to extend transversely of the direction of feed. A side guide 36 extends along the end of the feed table adjacent the billet chipping mechanism and is adapted to be contacted by the forward ends of the billets so as to guide the same as they are advanced along the feed table.

Means are provided for advancing the billets in rows along the feed table 10 from the receiving platform 30 to the discharge end thereof adjacent the input table 12. Such means comprises a plurality of slides 38 each of which is mounted on and guided by a pair of rollers 39, as is best shown in FIGURE 3. The slides extend in the direction of feed of the billets and carry a plurality of spaced dogs 40. The dogs 40 are adapted to engage the billets to push them toward the input table 12 during an advancing stroke of the slides 38. The dogs 40 are pivotally mounted so as to pivot downwardly out of engagement with the billets during a return stroke of the slides 38. The dogs 40 are constructed to move to a billet engaging position except during the return stroke by reason of their pivotal mounting as is best shown in FIGURE 3.

The slides 38 are interconnected by a member 42 extending transversely across the feed table 10 and secured to each of the slides 38. Power operated means in the form of four hydraulic cylinders 44 are provided for actuating the slides 38 toward and away from the discharge end of feed table 10. To this end, actuating rod of each cylinder 44 is secured to the transversely extending member 42. In locations in alignment with each of the cylinders 44, the transversely extending member 42 is connected to an equalizer shaft 46 by means of linkage 47. The equalizer shaft 46 extends transversely across the feed table and is mounted in bearings supported on the framework of the feed table 10. The linkage 47 and the equalizer shaft 46 function in a known manner to maintain the member 42, and hence the slides 38 connected thereto, in alignment during an actuating movement effected by the cylinders 44.

In operation, the feed table mechanism serves to feed billets in rows from the inclined platform 30 to the discharge end of the feed table 10 adjacent the input table 12. Briefly, this is accomplished by the operator causing the application of hydraulic pressure to the cylinders 44. When the cylinders 44 are actuated hydraulically, they cause movement of their actuating rods in the extending direction whereby the slides 38 are moved toward the receiving platform 30. The movement of the actuating rods of the cylinders 44 is, of course, transmitted to the slides 38 by way of the member 42, this member 42 being maintained in transverse alignment by the action of the equalizer shaft 46 and the linkage 47 as was described above. When the slides 38 move in the direction towards the receiving table 30, the dogs 40 turn in a clockwise direction as viewed in FIGURE 3 downwardly so that they can move past any billets resting on the feed table in their vicinity. The maximum rearward movement is shown by the dotted line illustration in FIGURE 3.

When the operator desires to feed billets toward the discharge end of the feed table 10, he causes hydraulic actuation of the cylinders 44 to cause a retracting movement of the actuation rods thereof. During this retracting movement, the slides 38 move toward the discharge end of the feed table 10 with the dogs thereof coming into engagement with the billets positioned forwardly thereof to thereby advance the same toward the discharge end of the feed table 10. It will be apparent that engagement of the dogs 40 with the billets will occur since the dogs 40 will be maintained in the upright position shown in FIGURE 3 by reason of the stops determining the position of the dogs 40.

Suitable control is provided so that the operator can cause the cylinders 44 to retract their actuating rods, extend their actuating rods, and to stop the movement of the cylinders 44 in a desired position. By reason of such a control mechanism, the operator has complete control to feed billets in a desired manner from the receiving table 30 to the discharge end of the feed table. The solid line position illustrated in FIGURE 3 represents the maximum movement of the slides 38 toward the discharge end of the feed table 10.

Means are provided for transferring billets from the discharge end of the feed table onto the input table 12 which comprises a plurality of rollers 48 which support a billet. Such means comprises an inclined slide means including a plurality of slide members 50 extending downwardly from the discharge end of the feed table 10 to the region of the rollers 48 of the input table 12. The slide members 50 serve to guide the billets onto trough-like surfaces presented by the rollers 48 as shown in FIGURE 4.

The billet transfer means also includes means for magnetically engaging a billet to remove the same from the feed table 10 and deposit it onto the slide members 50 so that the billet can slide onto the feed rollers 48 of the input table 12. The magnetic means comprises a plurality of billet transfer means 52 spaced along the discharge end of the feed table 10 above the input table as is best shown in FIGURES 1A and 4. Referring now to FIGURE 4, each of the transfer means comprises an electromagnet 60 supported on a mounting means 64 secured to the end of the slide member 62 as by welding and connected to the magnet 60 by suitable mounting screws. The tubular slide member 62 is received within a hollow cylinder 66 for sliding movement relative thereto, there being provided a suitable cam means 67 for preventing rotation of the slide member 62 relative to the cylinder 66. The cylinder 66 is mounted on the framework 70 forming part of the input table 12. A hydraulically operated cylinder 72 is supported at one end on the cylinder 66 and extends within the tubular slide 62. Extending from the other end of the hydraulic cylinder 72 is its actuating rod 74 which is secured to a block 76 which is in turn secured, as by welding, to the supporting means 64 for the magnet 60.

The hydraulic cylinder 72 is of conventional type and in response to the application of hydraulic pressure at either end causes a reciprocating movement of the rod 74. As is apparent from FIGURE 4, when the rod 74 is actuated from its retracted position to an extended position, the slide 62 and the magnet 60 will move from the solid position to the dotted line position in which the magnet is in magnetic engaging relationship with a billet positioned on the discharge end of the input table 12. In this manner, the magnet 60 may be positioned for magnetic engagement with a billet in response to the application of hydraulic pressure to the cylinder 72.

Figure 5:
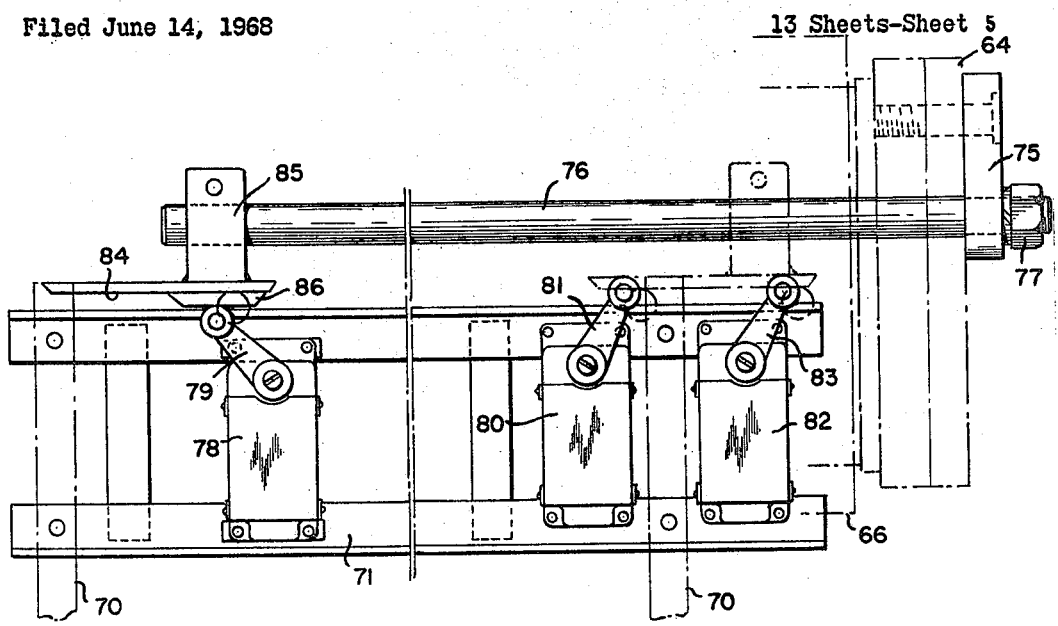
FIGURE 5 is a fragmentary section view of a detail.

Suitable control means are provided for controlling the energization of the electromagnet 60 and for controlling the application of hydraulic pressure to the cylinder 72. Referring to FIGURE 5, there is provided an arm 75 which is secured to the magnet supporting means 64 for movement therewith and for movement with the magnet 60. The arm 75 projects radially outwardly beyond the cylinder 66 and has a rod 76 secured to this outer portion by means of a mounting bolt 77. The rod 76 extends along the side of the cylinder 66 and is mounted to be parallel to the axis of this cylinder. Mounted on the framework 70 is a frame 71 which has three limit switches 78, 80 and 82 mounted thereon. The limit switches 78, 80 and 82 are provided with pivotally mounted control levers 79, 81 and 83, respectively, having rollers at their extended ends. Mounted on the extended end of the rod 76 is a switch actuating member 85 having a pair of switch actuating portions 84 and 86. The parts are arranged so that the roller for the control lever 79 of limit switch 78 is engageable by the portion 86 of member 85 and the rollers of the control levers 81 and 83 of limit switches 80 and 82 are engageable by the portion 84 of member 85 as the member 85 is moved with the rod 76 in accordance with the movement of the magnet 60 between the extended and retracted positions thereof as described above.

In operation, the normal position of each hydraulic cylinder 72 is with its actuator rod in the extended position with the magnet 60 being positioned adjacent the discharge end of the feed table 10. This serves to prevent the accidental discharge of a billet from the feed table 10. It is noted that there is also provided a suitable interlock control whereby unless the magnet is in the extended position, the hydraulic actuators 44 of the feed table 10 cannot be actuated to a billet feeding condition. This is achieved by connecting the limit switch 82 in the control circuit for the hydraulic actuators 44.

After the operator has actuated the billet feeding means of the feed table 10 to push a billet up against the extended magnet members 60, in which case a magnetic engagement will occur between the magnets and the billet, the operator then actuates the control means which energizes the magnet 60 and actuates the hydraulic cylinders 72 to cause their actuating rods 74 to move in the retract direction. After the rods 74 have moved a short distance in the retract direction, a distance which is set to insure that a billet has been removed from the feed table a sufficient distance so that it would drop onto the slides, the control lever 81 is released by the portion 84 of member 85 to move the switch 80 to a position deenergizing the magnet. When this occurs, the billet is released from the transfer mechanism and drops onto the slides 50 which guide the same onto the rollers 48 of the input table 12. The magnetic deenergization is also set to occur at a location which would prevent the pulling of a second billet from the feed table. This could possibly occur if the magnets 60 achieved a magnetic engagement with a second billet, although the mechanism is designed to avoid this.

When the parts reach the fully retracted position of the hydraulic actuators 72, then the switch 78 is actuated by the portion 86 of member 85 (as shown in solid lines in FIGURE 5) to a position which causes the hydraulic control to return the parts in the extended direction. When the parts are returned to the fully extended position of the hydraulic actuators 72, the control lever 83 of switch 82 is actuated by portion 84 of member 85 to actuate the hydraulic controls to maintain the hydraulic actuators 72 in the extended position with the magnets 60 adjacent the discharge end of the feed table. This is the normal position of the magnetic transfer members 52.

The input table 12 comprises a plurality of spaced rollers 48 aligned relative to the chipper and rotatably mounted on a suitable framework. As shown in FIGURE 4, each of the rollers 48 consists of a pair of conical portions 90 and 92 joined at an apex 94 and diverging from this apex at right angles. The rollers 48 are arranged with their apexes in alignment with the horizontal and with their axes in parallel relation. With this arrangement, the surfaces of the rollers in effect provide a right angular trough which conforms to the shape of the billets and serves to support the billets on two adjacent sides in a desired position. It will be apparent that the billets will be supported at an angle relative to the horizontal so as to present a side facing the operator, who stands in front of the machine facing the assemblies discussed above, so that this side is clearly visible to the operator during the chipping operation.

Each of the rollers 48 comprises a shaft 96 which extends outwardly from each end and which is rotatably supported on a pair of bearings 98. The rollers are driven in pairs by motors 100 which are connected to the shafts through reducers 102 and couplings 103.

Extending along the input table in the region between the spaced rollers 48 are a plurality of trough-like members 104. These members 104 also have a right angular trough configuration similar to the rollers 48. The members 104 are located to present surfaces spaced slightly below the surfaces presented by the rollers 48.

In operation, the input table 12 serves to deliver a billet supported thereon toward or away from the chipping station under the control of a suitable electrical control for the motors 100. All the motors 100 are controlled to operate together and may operate in either direction to cause rotation of the rollers 48 in either direction so as to feed a billet towards or away from the chipping station.

The output table 14 is constructed in a manner similar to that of the input table 12 and comprises a plurality of spaced rollers 49 aligned relative to the chipper assembly and the input table 12. The rollers 49 are mounted on a suitable framework and have the conical-like construction of the rollers 48 described above with respect to the input table. The rollers 49 are also arranged in a manner similar to the rollers 48 of the input table with their axes horizontal and in parallel relation. With this arrangement, the surfaces of the rollers 49 in effect provide a right angular trough which conforms to the shape of the billets and serves to support the billets on two adjacent sides thereof in the same manner as the input table.

Each of the rollers 49 comprises a shaft which extends outwardly from each end and is rotatably supported on a pair of bearings 105. The rollers 49 are driven in pairs by motors 106 which are connected to the roller shaft through reducers 107 and couplings 108.

Extending along the output table 14 in the region between the spaced rollers 49 are a plurality of trough-like members 109 which also have a right angular configuration similar to the rollers 49 and are spaced slightly below the supporting surfaces of the rollers 49.

The operation of the output table 14 is similar to that of the input table 12 and involves the feeding of a billet supported thereon toward or away from the billet chipping station by controlling the direction of the rotation of motors 106.

There are provided a pair of feed roll assemblies 18 and 20 located on either side of the billet chipping station and serving to feed a billet in either direction past the billet chipping station. The feed roll assemblies 18 and 20 may receive billets from or deliver billets toward either the inlet table 12 or the outlet table 14. The feed roll assemblies 18 and 20 are essentially identical and will be described with particular reference to FIGURES 2, 7 and 8.

The feed roll assembly 20 comprises an upper feed roll 110 arranged to be moved into driving engagement with the billet at its upper side which is to be chipped, and a lower feed roll 112 aligned with the upper feed roll 110 and spaced therefrom to engage the lower side of the billet opposite to the side to be chipped.

The feed roll assembly 20 comprises an upper feed roll 114 arranged to be moved into driving engagement with the billet at its upper side which is to be chipped, and a lower feed roll 116 aligned with the upper feed roll 114 and spaced therefrom for driving engagement with the lower side of the billet opposite to the side to be chipped.

Each of the lower feed rolls 112 and 116 is mounted in a fixed position and supported on the framework of the machine. The feed roll 112 is rotatably supported on a pair of bearings 118 supporting opposite ends thereof. The feed roll 116 is journalled at opposite ends in a pair of bearings 120.

Each of the feed roll assemblies 18 and 20 is provided with means for moving the associated upper feed roll between an upper retracted position and a lower position in driving engagement with the billet. To this end, the upper feed roll 110 is journalled in a pair of bearings 122 secured to a plate 124. The plate in turn is secured, as by welding, to the lower end of a tubular sleeve 126 mounted for sliding movement within a tubular member 128 mounted on the framework of the machine. A suitable cam and slot arrangement 129 is provided to prevent relative rotation between slide 126 and tubular member 128. Mounted on top of tubular member 128 is a hydraulic cylinder or actuator 130 comprising a rod 132 which is secured at its outer end to the plate 124. By this arrangement, the application of hydraulic pressure to the hydraulic cylinder 130 causes downward movement of the rod 132 and the feed roll 110 which is carried by the plate 124 to thereby cause engagement of the feed roll 110 with the billet therebeneath. Actually, the billet is pressed between the opposed feed rolls 110 and 112 to provide the feeding engagement.

Figure 8:
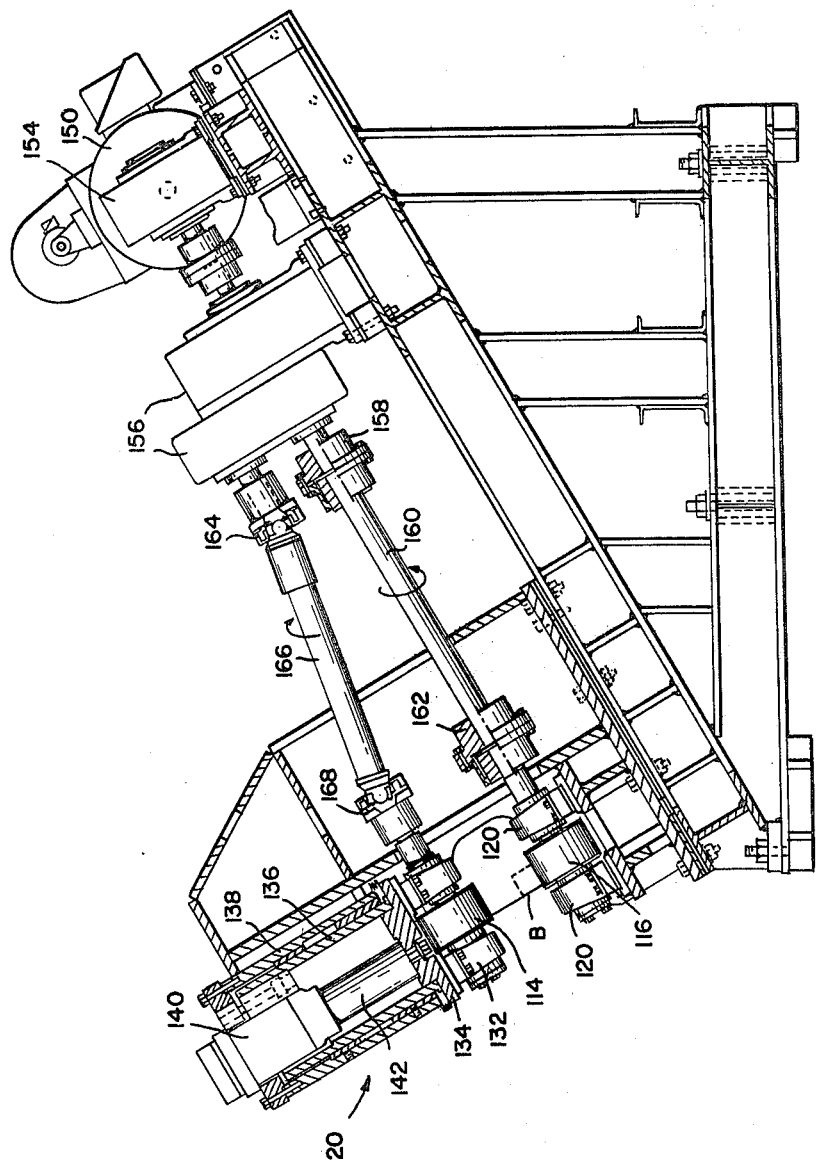
FIGURE 8 is a sectional view taken on line 8—8 of FIGURE 7.

As is best shown in FIGURE 8, a similar arrangement is provided for the feed roll assembly 20, the feed roll 114 being journalled in bearings 132 which are secured to a plate 134. The plate 134 is secured to the lower end of a tubular sleeve 136 slidably mounted within a tubular member 138 and guided to prevent rotation relative thereto. There is also provided a similar hydraulic cylinder or actuator 140 comprising an actuating rod 142. In a like manner the hydraulic cylinder 140 can be actuated hydraulically to cause movement to the feed roll 114 toward the feed roll 116 to clamp a billet in feeding engagement therebetween.

Figure 7:
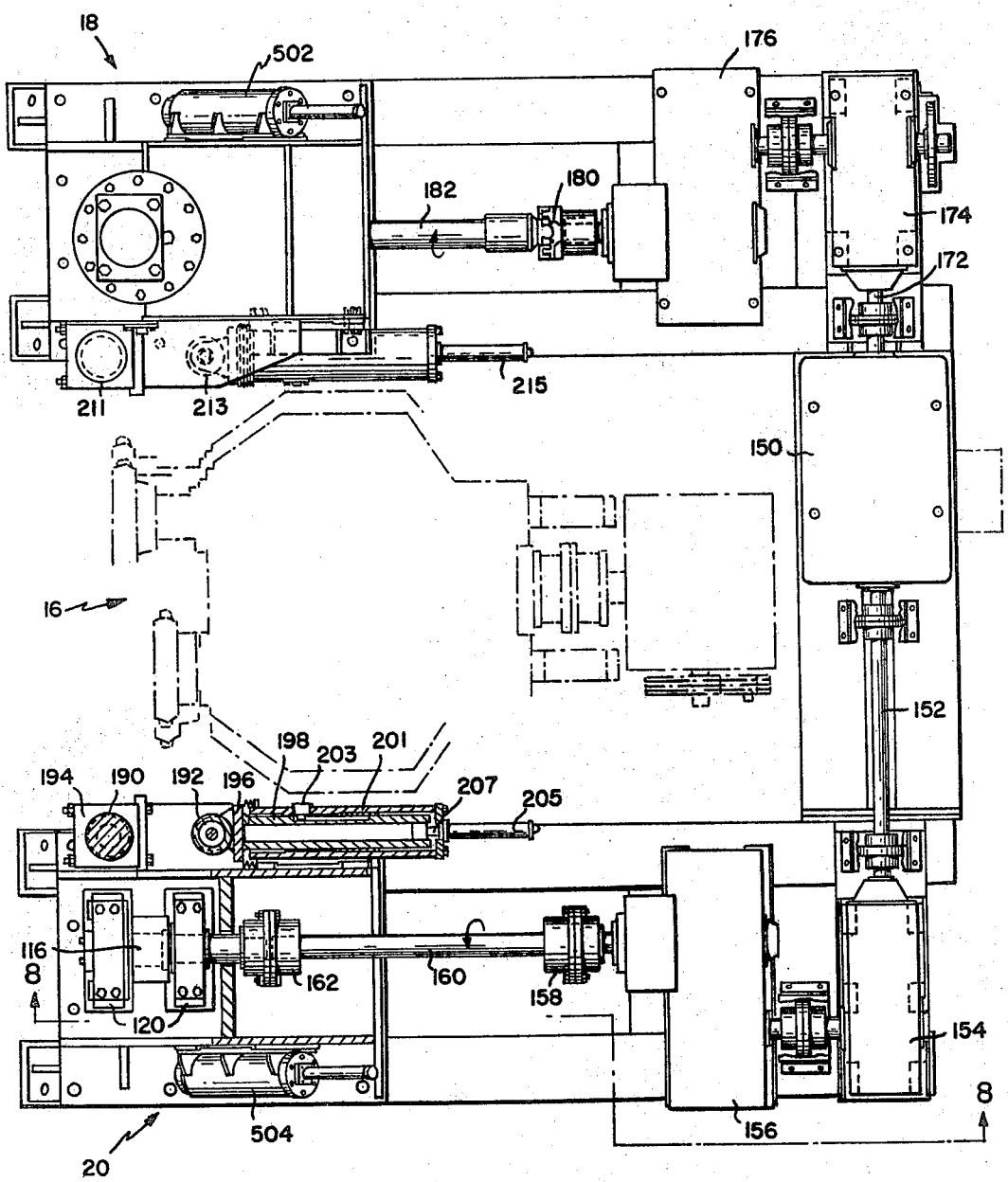
FIGURE 7 is a plan view of the feed roll assemblies of the billet chipper.

The drive means for the feed rolls comprises a reversible motor 150 mounted on the frame of the machine in a location best illustrated in FIGURE 7. One output shaft of the motor 150 is connected through a shaft 152 to reducer 154 which is, in turn, connected through a coupling to a reducer 156. One output shaft of the reducer 156 is connected through a coupling 158, a drive shaft 160 and a coupling 162 to the shaft of the feed roll 116 for driving the same. As is best shown in FIGURE 8, another output shaft of the reducer 156 is connected through a universal-type coupling 164, a drive shaft 166 and a universal-type coupling 168 to the shaft of the feed roll 114 for driving the same. By this arrangement the operation of the motor 150 causes the driving of the feed rolls 116 and 114 in the proper direction to cause the feeding of a billet.

The drive for the feed rolls 110 and 112 is essentially the same as that described above. Thus, another output shaft of the motor 150 is connected through a shaft 172 and a pair of reducers 174 and 176. One output shaft of the reducer 176 is connected through a drive shaft and coupling arrangement similar to that provided for the feed roll 116 and is connected to the feed roll 112 for driving the same. These parts are not shown in the drawings. Another output shaft of the reducer 176 is connected through a universal-type coupling 180, and a drive shaft 182 through another universal-type coupling for driving the upper feed roll 110.

It will be noted that the parts are arranged so that the two pairs of feed rolls for the assemblies 18 and 20 will operate to drive the billet in the same direction. This is illustrated by the arrows shown in FIGURES 7 and 8. Thus, while the feed roll pairs 110 and 112, 114 and 116 can be actuated to drive the billet in either direction by reversal of the motor 150, the parts are arranged so that the feed rolls for each of the assemblies 18 and 20 will operate to drive the billet in the same direction at the same time.

Each of the feed roll assemblies 18 and 20 is provided with a pair of side rollers for positioning the billet by contact with the surfaces thereof adjacent the surface to be chipped. To this end the feed roll assembly 20 is provided with a pair of side rollers 190 and 192 located adjacent the feed rolls 114 and 116 as is shown in FIGURE 7. The side roller 190 is mounted in a fixed location and is journalled at its opposite ends in a pair of bearings 194. The side roller 192 is journalled in bearings at the opposite ends thereof which are secured to a plate 196. The plate is secured to the end of a sleeve 198 which is mounted for axial sliding movement within a hollow cylinder 201, there being provided means 203 for preventing rotation of the sleeve relative to the cylinder 201. Mounted on the end of the cylinder 201 opposite the roller 192 is a hydraulic actuator 205. The rod 207 of the actuator is secured to the sleeve member 198. By this arrangement, the application of hydraulic pressure to the actuator 205 causes the extension of the rod 207 to cause movement of the sleeve 198 and the roller 192 toward the roller 190. By this action, a billet positioned between the rollers 190 and 192 is clamped therebetween under the pressure of the hydraulic actuator 205.

The feed roll assembly 18 is provided with a similar side roll construction, there being provided a fixed side roller 211 and a movable side roller 213. The side roller 213 is actuated toward the roller 211 by an arrangement similar to that described with respect to roller 192, the hydraulic actuator being indicated at 215.

It will be apparent that in each feed roll assembly, the billet is confined on all four sides, the feed rolls being in driving engagement with two opposite sides of the billet and the slide rollers being in clamping engagement with the billet at the other two opposite sides.

It is desirable that the motor for driving the feed rolls be adjustable to vary the speed of the feed rolls. For example, it is desirable that the feed rolls be driven at a speed suitable for the chipping operation, at another speed for positioning the billet, and at a third speed for a fast traverse of the billet past the billet chipping station.

Figure 9:
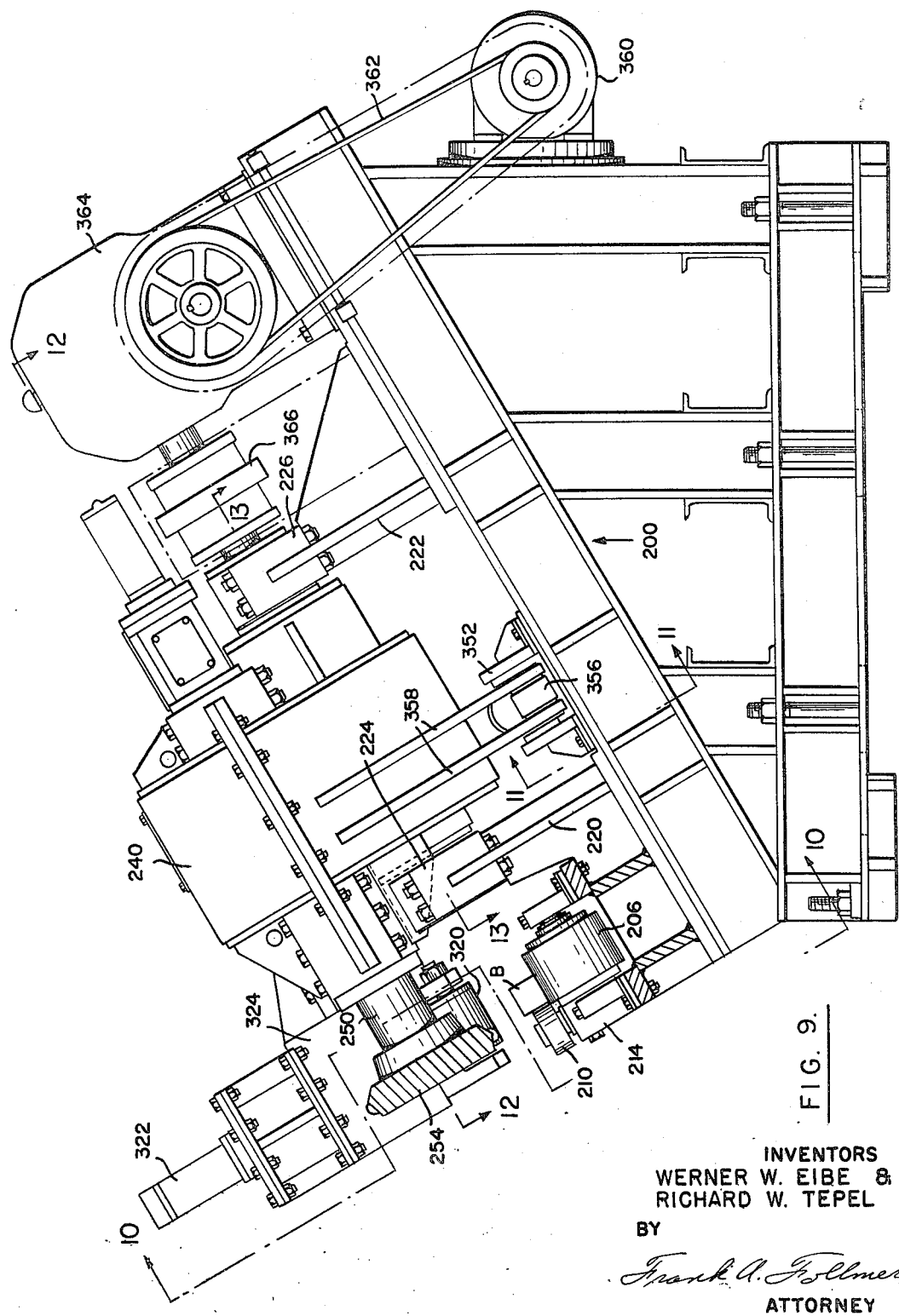
FIGURE 9 is a side elevation of the chipper assembly taken on line 9—9 of FIGURE 2.
Figure 10:
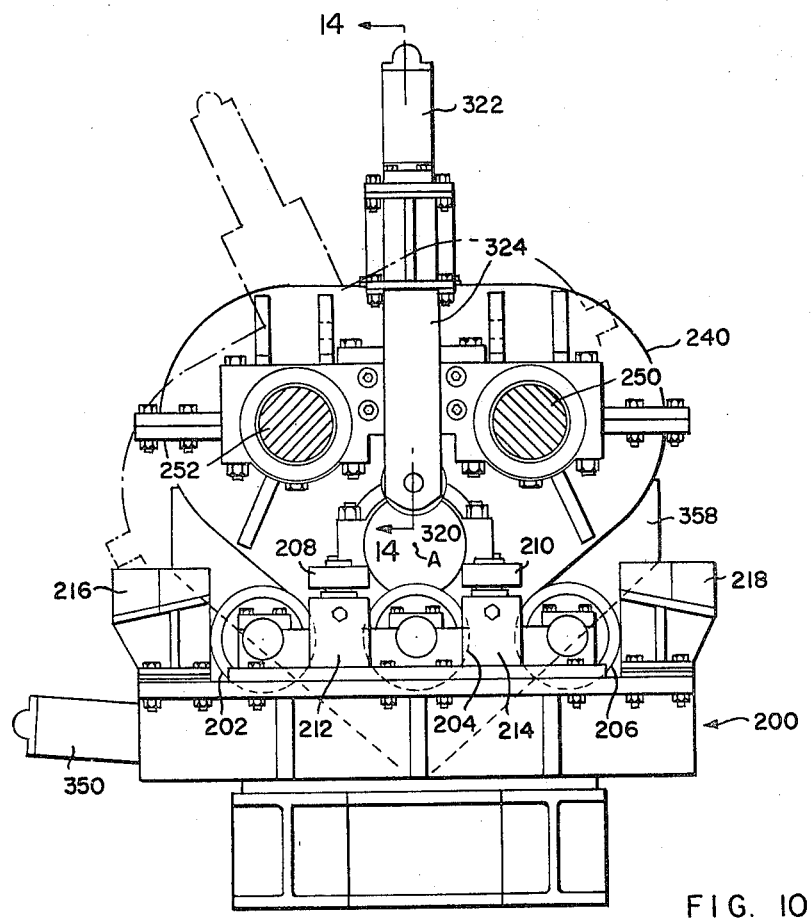
FIGURE 10 is a view taken on line 10—10 of FIGURE 9.

The chipper assembly 16 is best illustrated in FIGURES 2, 9, 10, 11 and 12 and comprises a supporting framework generally indicated at 200. Three billet supporting rollers 202, 204 and 206 are journalled in suitable bearings and are arranged to support the billet at the bottom side thereof opposite to the side to be chipped as is best illustrated in FIGURE 10. The billet engaging portions of the rollers 202, 204, and 206 extend along the pass line of the chipper. A pair of side supporting rollers 208 and 210 are rotatably mounted in suitable bearings 212 and 214, respectively. The side rollers 208 and 210 are arranged at right angles to the rollers 202, 204 and 206 and to provide support for the side of the billets adjacent the side to be chipped and facing forwardly. Accordingly, the two groups of rollers support the billet on the same sides as the rollers 48 and 49 on the input and output tables and support the billet in the same angular position presenting the side to be chipped at an angle to the horizontal and facing the operator.

Guides 216 and 218 are provided at the input table end and the output table end, respectively, of the chipper assembly 16. The guides 216 and 218 serve to direct or guide an approaching end of a billet into the supporting confines of the rollers 202, 204 and 206 and the rollers 208 and 210. As will be apparent hereafter, the two groups of rollers serve to take the forces applied to the billet by the chipping heads during a chipping operation.

The chipper assembly 16 comprises a stationary frame including a pair of upstanding support members 220 and 222 mounted at their lower ends on the frame 200 as shown in FIGURE 9. The upper ends of the supporting members 220 and 222 are provided with annular casings 224 and 226 containing rolling bearings 228 and 230, respectively.

A pinion gear 232 is supported at axially extending cylindrical end portions 234 and 236 on the bearings 228 and 230, respectively, whereby the pinion gear 232 is rotatably supported within said bearings As will be described hereafter, the pinion gear 232 serves as the drive for the cutter heads of the chipper. However, the pinion gear 232 has another function which is that of supporting a pivotal frame of the chipped assembly.

The chipper assembly comprises a pivoted frame including a gear box 240 having cylindrical portions 242 and 244 projecting in axial alignment from the sides thereof to enclose portions of the ends 234 and 236, respectively, of the pinion gear 232 as is best shown in FIGURE 13. Rolling bearings 246 and 248 are arranged, respectively, between the concentric overlapping portions 242 and 244 and the portions 234 and 236 so that the gear box 240 is rotatably supported on the ends 234 and 236 of the pinion gear 232 for pivotal movement around the axis of the pinion gear. The purpose of this arrangement will appear more fully hereafter.

Various elements of the chipper assembly 16 are mounted on the gear box 240 for movement therewith. As best shown in FIGURE 12, the arbors 250 and 252 which carry the cutting heads 254 and 256, respectively, at their forward ends are rotatably mounted on sides of the gear box 240. The arbor 250 is rotatably mounted in a pair of sleeve bearings 258 and 260 mounted in cylindrical bores in members 262 and 264 supported on the gear box 240. The arbor 252 is similarly mounted in sleeves 268 and 270 carried by members 272 and 274 supported on the gear box 240.

The arbors 250 and 252 are provided with gears 280 and 282, respectively, which rotate therewith and which are arranged to engage the pinion gear 232 so as to be driven thereby.

As shown in FIGURE 12, the gear box 240 is constructed to permit axial movement of the gears 280 and 282, the arbors of these gears being mounted and constructed for axial movement. As illustrated in FIGURE 12, the gear 282 is in the forward or extended end of its permissible travel, and the gear 280 is in the rearward or retracted end of its travel. This movement is necessary to permit the positioning of the cutting heads 254 and 256 at a proper location above the defects in the billet for effecting the chipping operation.

Means are provided for actuating the cutting heads 254 and 256 between the extended and retracted positions thereof. The actuating means for the cutting head 254 comprises a hydraulic cylinder 290 supported on the end of a housing 292 which is bolted to the member 264. The actuator rod 294 of the cylinder 290 extends into housing 292 and is connected to the end of the arbor 250 by an arrangement which provides for conjoint axial movement between the arbor 250 and the rod 294 but permits rotation of the arbor relative to the rod 294. This connecting means comprises a thrust bearing 296 mounted between the rod 294 and a cylindrical bore in the end of arbor 250, a lock nut 298 at the end of the rod 294 on one side of the thrust bearing 296, and a tubular member 300 secured to rod 294 on the other side of the thrust bearing 296. By this arrangement, when the rod 294 is moved to the left, the member 300 transmits movement to the arbor 250 by way of the thrust bearing 296, and when the rod 294 is moved to the right, the lock nut 298 transmits movement from the rod 294 to the arbor 250. The rod 294 carries a cam follower 305 which cooperates with a suitable guide track for preventing rotation thereof during its stroke.

The means for actuating the cutting head 256 between its extended and retracted positions are similar to that for the cutting head 254. Such means are best shown in FIGURE 12 and comprise a hydraulic actuating cylinder 310 supported on a housing 312 which is, in turn, supported on the member 274. The actuator rod 314 of the cylinder 310 is connected to the end of the arbor 252 by a connection indicated generally at 316. The connection 316 is similar to that described with respect to the arbor 250 and transmits the axial movement between the rod 314 and arbor 252 while permitting rotation of the arbor relative to the rod 314. It is noted that the rod 314 carries a cam follower 315 which cooperates with a guide track to prevent rotative movement of the rod 314 of the cylinder 310 as the rod 314 is actuated through its forward and return strokes.

Means are provided for the application of a clamping force onto the billet as it is being chipped by one of the cutting heads. The application of this force must be sufficient to hold or clamp the billet with sufficient force to prevent vibration thereof as a result of the forces applied to the billet during a chipping operation. Such means comprises a hold down or clamping roller 320 which is moved into contact with the billet onto the side thereof being chipped to thereby force the billet toward the three rollers 202, 204 and 206.

Figure 14:
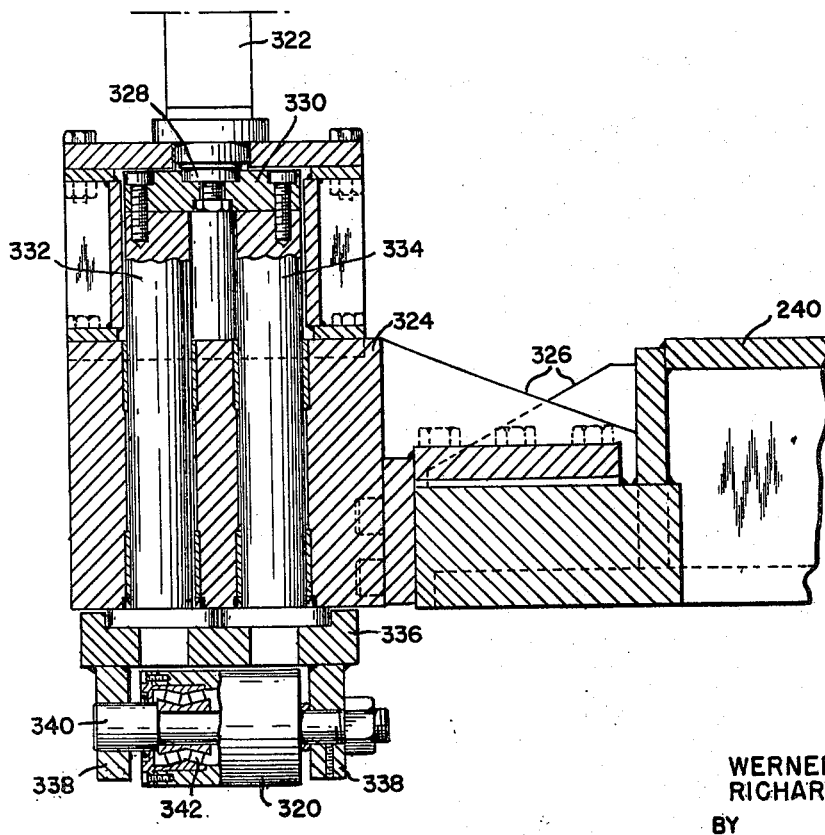
FIGURE 14 is a sectional view taken on line 14—14 of FIGURE 10.

The actuating means for the roller 320 comprises a hydraulic actuator or cylinder 322 mounted on top of a housing 324 supported on the gear box 240 by suitable brackets 326. Referring to FIGURE 14, the actuator rod 328 of the hydraulic cylinder 322 is secured at its lower end to a plate 330 which is connected to a pair of rods 332 and 334 extending downwardly through guide bores in the lower part of housing 324. The lower ends of the rods 332 and 334 extend beyond the lower end of the housing 324 and are connected by suitable mounting screws to a plate 336 by mounting screws (not shown). A pair of arms 338 project downwardly in spaced relation from the plate 336 and carry an axle 340 thereon. The roller 320 is supported on the axle 340 by a suitable rolling bearing means 342.

In operation, the application of hydraulic pressure to the cylinder 322 causes an extension of the rod 328 therefrom and a corresponding downward movement of the rods 332 and 334. Since the roller 320 is secured for movement with the rods 332 and 334, the roller 320 is also moved downwardly until it contacts the side of the billet to be chipped. The hydraulic pressure will be transmitted to the billet at the line of contact with roller 320 to thereby press the billet towards the rollers 202, 204 and 206. This clamping action on the billet serves to hold the same against vibration as a result of the forces produced during a cutting action of the cutting heads.

Means are provided for actuating the pivoted frame described above to tilt or rotate from a neutral position shown in solid lines in FIGURE 10 in either direction so as to place one or the other of the cutting heads 254 and 256 in an operative position. The two limit positions to which the pivoted frame can be moved are illustrated in dashed lines in FIGURE 2, the angular movement being approximately 25° in either direction from the neutral position.

The means for actuating the pivoted frame comprises a hydraulic actuator or cylinder 350 pivotally supported on a trunnion-like mounting 352 on the frame of the chipper assembly. The actuator rod 354 of the hydraulic cylinder 350 is connected by a clevis-type connection 356 to the lower ends of a pair of plates 358 extending downwardly from the gear box 240.

Figure 11:
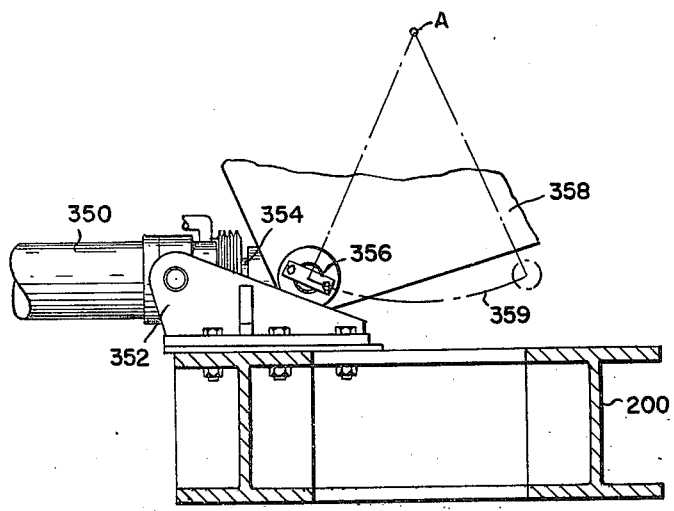
FIGURE 11 is a fragmentary view of a detail of the chipper assembly taken on line 11—11 of FIGURE 9.

In operation, by the application of hydraulic pressure to either end of the cylinder 350, the axis of the clevis 356 is moved to any of the positions along the arc 359 shown in FIGURE 11. Since the axis of the clevis moves in an arc, it will be apparent that the cylinder 350 will pivot about the axis of the trunnion mounting 352 as the actuator rod 354 is extended to the desired position. It will be apparent that since the pivoted frame is supported on the ends of the pinion gear 232, the pivotal movement of this frame will be about the axis of the pinion 232, this axis being indicated at A in FIGURES 10 and 11. It will also be noted that as this pivoting action takes place, the gears 280 and 282 will rotate about the pinion axis A and will be maintained in driving engagement with the pinion 232 by reason of the mounting arrangement described above.

Thus, when the operator wishes to move the cutting head 254 into a chipping position, the hydraulic cylinder 350 is actuated to retract rod 354 to pivot the pivoted frame in a clockwise direction about the axis of the pinion axis as viewed in FIGURES 10 and 11. Conversely, when the operator desires to move the cutting head 256 into operative position, the cylinder 350 is actuated to extend its rod 354 and thereby cause a counterclockwise pivotal movement of the pivoted frame about the axis of the pinion 232.

The drive means for the pinion gear 232 is best shown in FIGURES 9 and 12 and comprises a motor 360 mounted on the framework 200 of the chipper assembly. The outlet shaft of the motor is connected by a belt-type connection 362 to drive the input shaft of a reducer 364. The outlet shaft of the reducer 364 is connected to a coupling 366 the output end of which is connected in driving relationship to the end of the pinion gear 232. In this manner, the operation of the motor 360 is transmitted through the reducer 364 to cause rotation of the pinion 232 at a rate of speed appropriate to effect a cutting operation. It will be apparent that the rotation of the pinion 232 is transmitted through gears 280 and 282 to cause rotation of the cutting heads 254 and 256.

The cutting heads 254 and 256 may take various forms but are preferably a milling-type of cutter comprising a plurality of cutting tools 368 and 370 respectively, spaced circumferentially about the associated cutting head. The cutting tools are shaped as shown on FIGURE 12 to cut a relatively flat cut in the billet. Moreover, it will be noted that the cutting heads 254 and 256 are only effective to cut in one direction. The cutting head 254 arranged to rotate in a clockwise direction in FIGURE 2 and the cutting tools 368 will be operative to chip a billet moving from the input table 12 toward the output table 14 past the chipping station. Conversely, the cutting head 256 is rotated in a counterclockwise direction as viewed in FIGURE 2 and the cutters 370 are shaped and arranged to perform cutting on a billet moving from the output table toward the input table past the chipping station.

In the operation of the chipper assembly 16 to remove defects from the billet, the operator determines in which direction the billet is to be moved during chipping. He then actuates a suitable control which causes the appropriate chipping head 254 or 256 to rotate in the proper cutting direction for cutting by controlling the direction of rotation of the motor 360. There are also provided suitable hydraulic controls for controlling the operation of the hydraulic actuators 290 and 310 for actuating the arbors 250 and 252 for the cutting heads 254 and 256 and the tilt cylinder 350 of the chipper assembly 16. These motions are controlled by a conventional manual control involving a stick which controls the movement of the cutting heads in any desired direction by controlling the tilting movement and the axial movement thereof. The control also actuates the hold down clamp roller 320 to maintain a billet in fixed or clamped position during a chipping operation.

Thus, assuming the chipping operation is to be performed on a billet moving from the input table 12 toward the output table 14, the operator sets up the control to tilt the chipper assembly to place the right cutting head 254 downwardly and to cause rotation thereof in a clockwise direction as viewed in FIGURE 2. By means of the stick control, the operator can manually cause manipulation of the cutting head 254 for chipping the defects of the billets as it is moving from the input table toward the output table past the chipping station. It will be apparent that a similar operation is effected when chipping a billet moving from the output table 14 toward the input table 12 in which case the left chipping head 256 is tilted downwardly and is caused to rotate in a counter-clockwise direction.

Desirably, the clamp roller 320 is automatically lowered and moved to the clamping position whenever the pivoted frame chipper assembly 16 leaves the neutral position, suitable limit switches being provided to achieve this interlocking function. Moreover, the clamping roller 320 should remain in the downward position until the chipper assembly is returned to the neutral position.

Means are provided for lifting a billet off the rollers of either the input table 12 or the output table 14. The lifting means for the input table comprises six elevator means 400 located at spaced locations along the length of the input table as is shown in FIGURE 1A. The lifting means for the output table comprises six elevator means 402 located at spaced locations along the length of the output table as is shown in FIGURE 1B. The elevator means 400 and 402 are essentially identical and a detailed illustration thereof appears in FIGURE 15 to which reference is now made.

Each elevator means is positioned adjacent one of the rollers of the input or output table and comprises a billet supporting platform 404 which presents a rounded supporting surface to the billet. The platform 404 is carried by an arm 406 pivotally mounted at one end on a pivot pin 408 mounted on the framework of the machine by suitable supporting members 410.

Each of the elevator means is provided with means for pivoting the arm 406 and the platform carried thereby about the pivot pin 408. Such means comprises a hydraulic actuator or cylinder 412 pivotally mounted at its lower end on a pin 414 which is mounted on the framework of the machine. The outer end of the actuator rod 416 of the hydraulic cylinder 412 is pivotally connected to a pin 418 carried by the arm 406.

By this arrangement, the actuation of the hydraulic cylinder 412 will serve to move the platform 404 between an upper position shown in solid lines in FIGURE 15 and a lower position shown in dashed lines in this figure. The actuation of the cylinder 412 to position the rod 416 in its extended position will move the platform 404 to the upper or billet elevating position. The actuation of the cylinder 412 to move the rod 416 to its retracted position will serve to position the platform 404 in the lower position.

As shown in FIGURE 15, in the upper position the platform 404 extends above the supporting surfaces of the roller 48 adjacent thereto. Thus, when the platform 404 is moved from the lower position to the upper position, it serves to contact a billet supported on the roller 48 and raise the billet out of the supporting surfaces of the rollers. With the billet in this position, it will be possible to turn the billet about its axis, the turning region being illustrated by the circle in FIGURE 15. Of course, the rounded surface of the platform 404 permits this type of rotation while the trough-like supporting surfaces of the rollers would retard any such movement.

In operation, all of the elevators 400 on the input table 12 are actuated between upper and lower positions in unison. This is also the case with all of the elevators 402 on the output table 14. In this manner, the actuation of the two groups of elevator means to the upper position will serve to lift an entire billet out of the confines of the rollers of the corresponding input or output tables.

Means are provided for turning a billet to successively present the various sides thereof in position to be chipped. Such means comprises the turners 22 and 24 which are essentially identical in construction. Each of the turners 22 and 24 are constructed in the manner illustrated in FIGURES 16 and 17. Each of the turners 22 and 24 comprises a turner supporting frame 430 provided with a pair of horizontally extending, spaced, aligned journal supports 432 and 434. Rotatably mounted in the supports 432 and 434 is a turner body 436 comprising a pair of projecting tubular members 438 and 440 journalled within the supports 432 and 434, respectively, for rotatable support on suitable sleeve bearings 442 and 444, respectively.

The turner body 436 is provided with a pair of openings 446 and 448 for receiving the billets moving into the turner assembly. A pair of guides 450 and 452 provided with ramps serve to guide the billets into the openings 446 and 448, respectively.

Jaw means are provided for gripping a billet extending within the turner chamber between the openings 446 and 448, the jaw means serving to grip the billet during a turning movement thereof. Such means comprises a lower jaw means including a lower cylindrical housing 454 carried by the turner body 436. A hydraulic actuator cylinder 456 is mounted within the housing 454 and has the end of its actuator rod 458 secured to a plate 460. The plate 460 is secured to the end of a tubular sleeve 462 arranged for axial sliding movement within a cylindrical bore within housing 454. The sleeve 462 is guided for a straight sliding movement by means of a roller and guide slot arrangement 464 which serves to prevent rotation of the sleeve 462 as it is moved axially. A billet gripping jaw 466 is secured to the plate 460, as by mounting screws, and comprises a pair of spaced jaw members 468 provided with right angular gripping surfaces 470. Accordingly, the billet will be contacted along two adjacent sides by the gripping surfaces 470. It will also be apparent that the hydraulic cylinder 456 can be actuated to cause the extending of its actuator rod 458 to thereby move the gripping jaws 468 toward a billet positioned within the turner chamber. The maximum upward movement of jaws 468 is shown by the dashed lines in FIGURE 16.

There is also provided an upper jaw means including an upper cylindrical housing 474 carried by the turner body 436. A hydraulic actuator 476 is mounted within the housing 474 and has the outer end of its actuator rod 478 secured to a plate 480. The plate 480 is secured to the end of a tubular sleeve 482 arranged for axial sliding movement within a cylindrical bore within housing 474. The sleeve 482 is guided for a stright axial movement by a suitable roller and guide slot arrangement 484 which holds the sleeve 482 against rotation relative to the housing 474. A billet gripping jaw 486 is secured to the plate 480 as by mounting screws and comprises a jaw member 488 provided with right angular gripping surfaces 490. The gripping surfaces 490 thus contact a billet on two adjacent sides thereof. It will be apparent that actuation of the hydraulic actuator 476 can cause an extension of the rod 478 to cause the gripping jaw 488 to move toward a billet contained within the turner chamber.

Means are provided for causing a turning movement of the turner body 436 and the parts carried thereby. This means comprises a hydraulic actuator 492 pivotally supported on a pin 494 at its lower end, the pin 494 being mounted on the frame 430 of the turner assembly. The actuator rod 496 of the hydraulic actuator 492 is pivotally connected at its outer end to a pin 498 which is carried by a support means on the turner body 436.

The parts are constructed so that the hydraulic actuation of the turner actuator 492 to retract the rod 496 from the extended position shown in solid lines in FIGURE 16, to its retracted position shown in dashed lines in FIGURE 16, will cause a 90° rotation of the turner body 436 to the dashed line position shown in this figure. A subsequent extension of the cylinder 496 will return the body through a 90° movement to the solid line position shown in FIGURE 16.

A guide rail means 500 is provided to protect the operator from possible contact with the turner during a turning movement. The guide rail 500 is secured to the frame 430 of the turner assembly.

It will be apparent that during the turning movement of the turner body 436, the members 438 and 440 are rotated about the bearings 442 and 444 contained within the journal supports 432 and 434, respectively.

It will be noted that a turning operation of a billet can be performed by means of either the turner 22 or the turner 24 or by the use of both turners in engagement with the billets. In the latter case, both the turners 22 and 24 and the associated elevators 400 and 402 are operated together.

Means are provided to engage a billet during a part of the billet turning cycle when, after the billet has been turned and released by the gripping mechanism, the billet is lowered back onto the table feed rollers 48 or 49. This means comprises a pair of hydraulic actuators 502 and 504 mounted on the frames of the feed roll assemblies 18 and 20 adjacent the turners 22 and 24, respectively. The actuator 502 cooperates with the turner 522 and the actuator 504 cooperates with the turner 24 in the manner to be described more fully hereafter. Briefly stated, the actuators serve as hold down means by positioning their actuator rods to engage the billet and bias the same downwardly during a portion of the turning cycle.

The sequence of operation involved in the turning of a billet comprises the steps of clamping of a billet within the turner chamber by the actuation of the gripping jaws 468 and 488 inwardly, the lifting of the billet off the table rollers 48 and 49 of the appropriate input or output table by the elevators 400 and 402, the 90° rotation of the turner mechanism, the opening of the grippers, and the lowering of the billet back onto the table rollers 48 or 49 by the downward movement of the elevators 400 and 402. Suitable control means are provided for achieving the above-described turning operation.

Assuming that a billet is on the input table 12 and it is desired to turn the same to present the next side for a chipping operation, the operator first feeds the billet into the turner 22 so as to extend through the openings 446 and 448 and within the turner chamber. The operator then actuates the gripping cylinders 456 and 476 to cause extension of their respective rods 458 and 478 whereby the gripping jaws 468 and 488 are moved together to grip the billet therebetween.

The billet will be raised, for example, from the solid line to the dashed line position shown in FIGURE 16. The jaw 488 will move between the spaced jaws 468 during a gripping movement, this construction permitting the gripping of various size billets by the jaws 468 and 488.

The operator then actuates the elevator cylinders 412 to cause the same to move the elevator platforms upwardly and lift the billet off of the input table 12. The billet is now gripped at one end by the gripping jaws and is supported on the elevators 402 above the feed rollers 48. With the parts in this position, the operator may now energize the turner hydraulic actuator 492 to cause a 90° rotation of the billet, the platforms 404 of the elevators 402 serving to support the billet as it is rotated.

When the turner actuator 492 has completed its stroke, which may be indicated by a limit switch, the hold down actuator 502 is actuated to extend its actuator rod and place the end thereof in contact with the billet. The operator then actuates the jaw gripping cylinders 456 and 476 to retract their associated rods and release the billet. At the same time, the elevator cylinders 412 are actuated to lower the elevator platforms 404. The billet then drops downwardly toward the table rollers, during which movement the actuator rod of the hold down actuator 502 is maintained in contact with the billet to hold the same in the proper orientation. At the end of the downward movement of the elevator cylinders 412, an appropriate limit switch may be actuated to return the hold down actuator 502 to its retracted position. At the same time the hold down actuator 502 is retracted, the turner actuator 492 may be actuated to cause extension of its actuator rod 494 and turn the turner body 436 90° to the normal position thereof.

It will be apparent that appropriate controls can be provided to interlock the above-described sequence and to provide for completely automatic turning. Alternately, suitable push buttons may be provided for effecting the above functions by a manually actuated control operation.

Means are provided for discharging a billet from the output table after the chipping operation is completed and delivering the same either to a group of front cradles 516 or a group of rear cradles 518 positioned adjacent the front and rear sides, respectively, of the output table 14. Such means comprises six kick-off means 520 spaced along the length of the output table 14 as is shown in FIGURE 1B. The construction of each kick-off means 520 is the same and is shown in detail in FIGURE 18 to which reference is now made.

The cradles 516 and 518 comprise a plurality of members extending downwardly from the top of the output table 14 to form a receiving trough adapted to receive and hold billets delivered thereto. Thus, a billet delivered onto a sloping portion of the cradles 516 and 518 will slide down this portion thereof to be received and held in the trough forming portion thereof.

Each of the kick-off means 520 is provided with means for lifting the billet out of the output table rollers 49 and delivering the same to the front cradles 516. Such means comprises a platform 522 secured at its forward end onto a rod 524 which is rotatably supported in a bearing means 526. The rod 524 extends the length of the output table 14 and is received in bearing means located at the spaced intervals of the kick-off means along the length of the output table 14, there being provided a bearing means 526 for each of the kick-off means 520.

There is provided a kick-off hydraulic actuator 527 which is pivotally mounted at its lower end at 528. The hydraulic actuator 527 has an actuator rod 530 which is pivotally connected at its outer end to the platform 522 at a pin 532. It will be noted that the platform 522 is arranged to project from the region of the rod 524 downwardly to a location beneath the apex 95 of the output table roller 49. The platform 522 carries a billet engaging finger 534 at its lower end which finger extends upwardly from the platform as shown in FIGURE 18.

Figure 18:
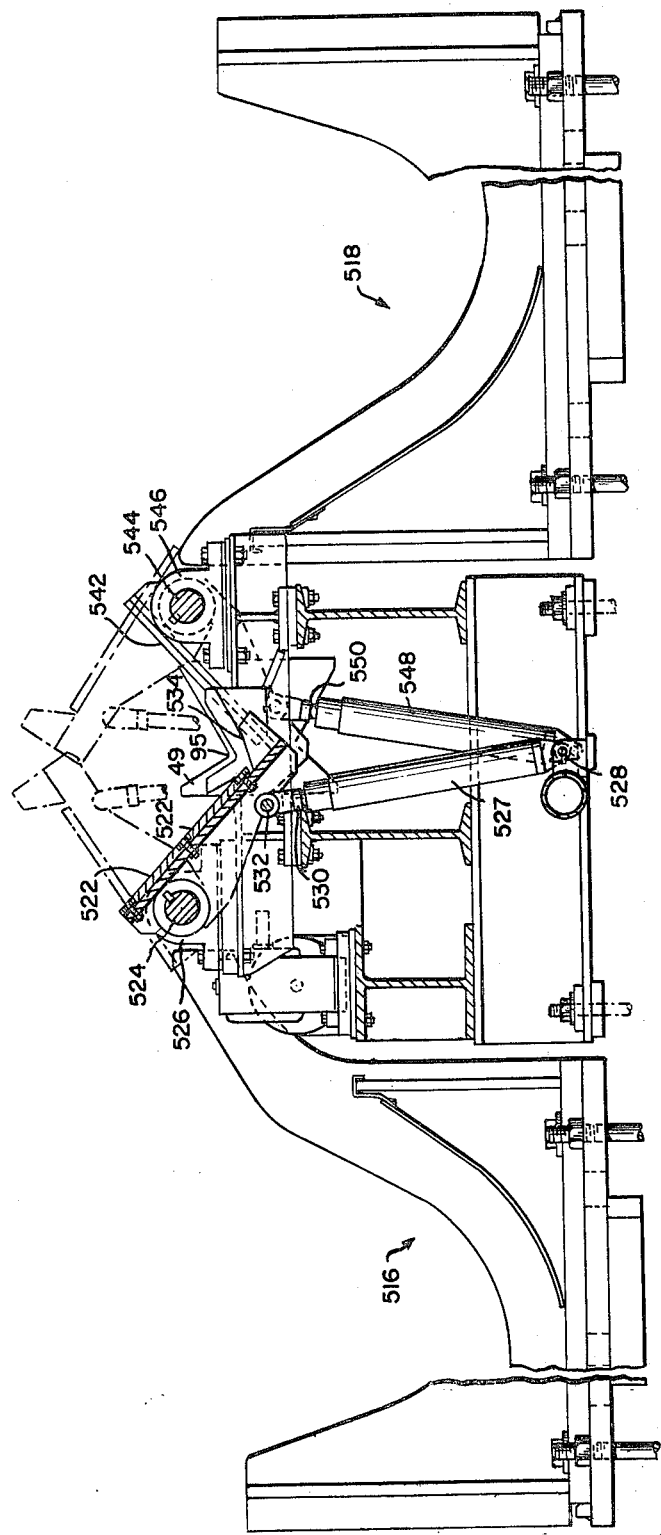
FIGURE 18 is a sectional view illustrating the kick-off mechanism of the billet chipper.

In operation, when it is desired to deliver a billet to the front cradles 516, the hydraulic actuator 527 is actuated to move the rod 530 from the retracted position to an extended position shown in dotted lines in FIGURE 18. When this occurs, the rod 524 is rotated in a counter-clockwise direction as viewed in FIGURE 18. This movement of the rod 524 causes a corresponding rotation of the platform 522 from the solid line position to the dotted line position shown in FIGURE 18. It will be apparent that when this occurs, a billet will be engaged by the platform 522 and the finger 534 and raised to an upper position whereby it will slide along the platform 522 when the platform reaches an inclined position extending upwardly from rod 524 and be discharged onto the upper end of the cradles 516. The billet will then roll or slide down the cradles 516 into the trough portion thereof.

Each kick-off means 520 is also provided for means for lifting a billet from the output table rollers 49 and delivering the same to the rear cradles 518. This means is essentially the same as the front kick-off mechanism and comprises a platform 542 carried by and keyed to a rod 544 which is rotatably supported in a bearing means 546. There is also provided a hydraulic actuator 548 associated with each platform 542 by having its actuator rod 550 pivotally connected to this platform.

The operation of the mechanism for delivering a billet from the output table 14 to the rear cradles 518 is the same as the mechanism for delivering billets to the front cradles 516. Briefly, the actuation of the hydraulic actuator 548 to move its rod 550 from the retracted position shown in solid lines in FIGURE 18 to the extended position shown in dashed lines in FIGURE 18 serves to lift a billet out of the rollers 49. When the platform 542 reaches an inclined position extending upwardly from the rod 544, the billet will be discharged onto the upper end of the cradles 518. The billet will then roll or slide down the cradles 518 into the trough portion thereof.

As shown in FIGURES 1A and 1B, there are provided suitable stop means 560 and 562 at the ends of input table 12 and output table 14, respectively, for preventing the accidental feeding of a billet off the associated table.

In the above description, the operation of each of the various assemblies of the billet chipper was described in detail in conjunction with the description of its construction. In order to provide a better understanding of the broader aspects of the billet chipper in accordance with the invention, the following general description of the overall operation is deemed to be of value.

Billets with visible markings on their surfaces locating the defects are delivered to the feed table 10 by suitable billet handling equipment. The operator, by controlling the operation of the feed table hydraulic cylinders 44, feeds the billets across the feed table 10 toward the discharge end thereof to position a billet into contact with the magnets 60 of the magnetic transfer means 52. A billet to be chipped is then transfererd from the feed table 10 onto the rollers 48 of the input table 12 by the operation of the magnetic transfer means 52 involving the actuation of the hydraulic cylinders 72 as described above. By reason of the conical-like construction of the rollers 48 the billet will be positioned angularly relative to the horizontal to present an upper side inclined rearwardly, this side facing the operator of the billet chipper so as to be viewed clearly by him.

The operator then causes energization of the motors 100 to feed the billet toward the chipping station by means of the rollers 48. The billet is stopped after the leading end thereof is positioned within the feed roll assembly 18. The operator then actuates the hydraulic cylinders of the feed roll assemblies to force the feed rolls 110 and 112 and the side rollers 211 and 213 into contact with the billet and energizes the motor 150 to drive the rolls 110 and 112 at the chipping speed to feed the billet toward the chipping station.

As a portion of the billet having a defect thereon passes the chipping station of the chipper assembly 16, the operator tilts the cutting head 254 downwardly into cutting engagement with the billet. The cutting head 254 will be positioned transversely of the billet by the actuation of the hydraulic cylinder 290 controlling the movement of its arbor so as to cut the portion of the billet having the defect thereon. Also, the clamp roller 320 of the chipper assembly 16 is actuated into engagement with the billet to clamp the same tightly and prevent vibration thereof during a chipping operation.

When the leading end of the billet moving from the input table to the output table passes between the rollers 114 and 116 of the feed roll assembly 20, the operator actuates the hydraulic cylinders thereof to place the feed rolls 114 and 116 into driving engagement with the billet and the side rollers 190 and 192 into contact with the billet. It will thus be noted that as the billet continues to be fed from the input table 12 toward the output table 14, the billet is contacted by all the various rollers of the two feed roll assembly means 18 and 20 and the chipping assembly 16, namely, feed rolls 110, 112, side rollers 211 and 213, clamp roller 320, the chipper assembly support rollers 202, 204, 206, 208 and 210, the feed rolls 114 and 116, and the side rollers 190 and 192. Accordingly, the billet is very securely held in the desired position for chipping.

As the first side of the billet has had the defects chipped therefrom, it has been fed onto the output table 14. The operator now positions the left end of the billet within the turner chamber of the turner 24, such as by the actuation of the output rollers 49 to feed the billet toward the input table. The billet is now turned 90° by the operation of the turner 24 in conjunction with the operation of the elevator means 402 of the output table 14 as was described in detail in connection with the detail description of the turner assembly operation.

The billet is then fed from the output table 14 toward the input table 12 by means of feed roll assemblies 20 and 28 in generally the same manner described above when the billet is fed in the opposite direction. The only essential difference is that the feed rolls are rotated in the opposite directions.

When a portion of the billet containing a defect approaches the chipping station, the operator by the use of the control stick tilts the chipper head 256 downwardly and positions the same in the proper transverse position to effect a chipping operation to remove these defects. This is achieved by controlling the tilt cylinder 350, the cutter head cylinder 310, and the direction of rotation of motor 360. During this chipping operation, the clamp roller 320 is, of course, moved downwardly to clamp the billet in the region of the chipping station to prevent vibration thereof.

After the second side of the billet has been chipped, let us assume it is now positioned entirely on the input table 12. The billet is then fed into the chamber of the turner 22 such as by operation of the input rollers 48. The turner 22, in cooperation with the elevator means 400 of the input table 12, is now actuated to turn the billet 90° to present the third side thereof in position for the removal of the defects thereon by a chipping operation. The billet is then fed from the input table 12 through the feed means 18 and 20 and the chipper assembly 16 toward the output table 14, with the defect removal being achieved by the cutter head 254 in the manner described above.

When the third side has had the defects removed therefrom, the billet is again turned 90° by operation of the turner assembly 20 as was described previously to present the fourth side of the billet in position for chipping. The billet is then fed from the output table 14 toward the input table 12 by the operation of the feed rollers 18 and 20 as was described above, during which movement the operator removes the defects by means of the cutter head 256.

The billet is now positioned on the input table and has had defects removed from all four sides thereof. The operator then actuates the input table rollers 48 and the feed rollers 18 and 20 to move the billet onto the output table 14. The operator then actuates the desired kick-off means to remove the billet from the output table 14 into either the front cradle 516 or the rear cradles 518 in the manner described above with respect to the operation of the kick-off means.

The above description relates to removal of defects from a billet having defects on all four sides thereof. It will be apparent, however, that if a billet does not have a defect on one of its sides, during a turning operation the turner will be actuated through successive turning operations to turn the billet twice through 90° movement to thereby turn past this side which has no defects. Also, if the operator wishes to effect a turning operation after only a part of the billet has been chipped (such as where the billet has defects on only a portion of its length), the turning may be achieved with the billet extending within both of the turners 22 and 24. In this case, the billet will be gripped by both of the turner mechanisms and raised by both the elevators 400 and 402 of the input and output tables. Accordingly, it will be evident that the operator has great versatility in the manipulation of the billet to remove the defects thereon by the chipping mechanism.

It is to be understood that the above description is illustrative and it will be apparent that various changes may be made in the construction and arrangement of parts without departing from the scope of the invention. Accordingly, it is not desired to be limited except as required by the following claims.

We claim:

1. In a billet chipper for removing surface defects from an elongated billet, the combination comprising a chipper assembly defining a chipping station where the defects are removed from the surface of the billet and including a pair of rotating cutting heads adapted to remove defects from the surface of a billet, a first elongated table means adapted to support a billet in a generally horizontal position and arranged on one side of said chipper station and in alignment therewith, a second elongated table means adapted to support a billet in a generally horizontal position and arranged on the opposite side of said chipper station in alignment therewith, means engageable with a billet for feeding the same past the chipping station in either direction between said first and second table means, means for moving one or the other of said cutting heads into contact with a billet moving past the chipping station for effecting the removal of defects therefrom, one of said cutting heads being adapted, in response to rotation thereof in a predetermined direction, to remove material from a billet moving in the direction from said first table means to said second table means, the other of said cutting heads being adapted, in response to rotation thereof in a predetermined direction, to remove material from a billet moving in the direction from said second table means to said first table means, and means for turning a billet about the longitudinal axis thereof to present various surface portions thereof to said cutting heads for the removal of the defects therefrom.

2. The combination according to claim 1 including means for delivering billets one at a time to one of said table means, and means for discharging a billet from one of said table means.

3. The combination according to claim 1 including means for delivering billets one at a time to one of said table means including a feed table means adjacent said one table means for supporting billets in a generally horizontal plane, means for feeding a billet along said feed table means toward a discharge end thereof immediately adjacent said one table means with the billets extending in a generally parallel relation to the longitudinal axis of said one table means, and means for transferring a billet from the discharge end of said feed table onto said one table means.

4. The combination according to claim 3 wherein said transfer means includes a plurality of magnetic members arranged in spaced relation along the discharge end of said feed table and mounted for movement from a first position in which the magnetic members are magnetically engageable with a billet at the discharge end of said feed table means in a direction toward said first table means, means for sensing a predetermined movement of said magnetic members in the direction of said first table means for causing deenergization of said magnetic members to release the billet carried thereby, and means for guiding a billet from the released position thereof onto said first table means.

5. The combination according to claim 1 wherein said turner means includes a first turner assembly on one side of said chipping station and associated with one of said table means, and a second turner assembly on the other side of said cutting station and associated with the other of said table means.

6. The combination according to claim 5 wherein each of said turner assemblies includes means for gripping a billet supported on the associated table means, means supporting said gripping means for rotation relative to the longitudinal axis of a billet supported on a table means, and means for causing rotation of the gripping means and a billet gripped thereby about the longitudinal axis of said billet.

7. The combination according to claim 6 wherein said means for causing rotation of a billet is adapted to cause a rotation stroke of 90°, and said gripping means is adapted to release a billet after a 90° rotation has been applied thereto.

8. The combination according to claim 1 wherein each of said table means includes a plurality of longitudinally spaced rollers mounted for rotation on an axis transverse to the longitudinal axis of said table means, each of said rollers having a configuration presenting a right angular billet engaging and supporting portions, whereby the billet is supported on adjacent sides thereof by said billet engaging portions of said rollers.

9. The combination according to claim 8 including means for rotating a plurality of said roller means for feeding a billet toward said chipping station.

10. The combination according to claim 8 including means for lifting a billet on said table means off said rollers thereof, said means including a plurality of spaced platforms movable from a position beneath said rollers to a position above said rollers, said platforms presenting a surface to said billets which permits rotational movement of the billet about its longitudinal axis.

11. The combination according to claim 1 wherein said billet feeding means includes a first billet feeding assembly located between said chipping station and the first table means, and a second billet feeding assembly located between said chipping station and said second table means, each of said feeding assemblies being operable to feed a billet in either direction past the chipping station.

12. The combination according to claim 11 wherein said first billet feeding assembly includes a pair of feed rolls arranged in opposed relation for contacting opposite sides of a billet, one of said pair of feed rolls being movable toward the opposed roll to clamp a billet under pressure therebetween, means for causing rotation of at least one of said pair of feed rolls, and a second pair of rollers arranged in opposed relation for contacting the other two opposite sides of a billet, one of said second pair of rollers being movable toward the other for clamping a billet under pressure therebetween.

13. The combination according to claim 1 wherein said chipper assembly includes means providing a rolling support for the side of a billet beneath the side to be engaged by the cutting heads during a chipping operation, means for providing a rolling support for at least one other side of said billet adjacent said supported side, and means for contacting the working side of a billet in the region of said chipper station and applying a substantial force thereto to urge the same toward said first-mentioned rolling support means.

14. The combination according to claim 13 wherein said means for applying a force to said billet includes a roller arranged to contact the working side of said billet in the location between the pair of cutting heads.

15. The combination according to claim 1 wherein said chipper assembly includes a pivoted frame, said cutting heads being mounted on said pivoted frame for movement therewith, said pivoted frame being movable from a neutral position wherein said cutting heads are inactive and spaced from a billet at the chipping station in one pivotal direction to place one of said cutting heads into working engagement with a billet and in the opposite pivotal direction to place the other of said cutting heads into working engagement with a billet.

16. In a billet chipper for removing surface defects from an elongated billet, a chipper assembly defining a chipping station where the defects are removed from the billet and comprising a cutting head means movable from an inactive position toward a billet moving past the chipping station to engage a first billet surface which is to have defects removed, means providing a rolling support for the billet on the surface portion thereof opposite said first billet surface, means providing a rolling support for the billet at right angles to said first mentioned rolling support, said rolling support means receiving the forces applied to the billet during a cutting operation, means movable from a retracted position into contact with a billet at the cutting station to apply a substantial force to said billet toward said rolling support means to clamp the billet therebetween and prevent vibration thereof by reason of the forces developed during a cutting action by said cutting head means, and means for feeding a billet in either direction past said chipping station including a first billet feed means on one side of said chipper station and a second billet feed means on the other side of said chipping station, each of said billet feed means including a first pair of rollers for clamping the billet under pressure at opposite surface portions thereof, and a second pair of rollers for clamping the billet at opposed portions thereof under pressure and at right angles to said first pair of clamping rollers.

References Cited

UNITED STATES PATENTS

| | | | |
|---|---|---|---|
| 3,118,254 | 1/1964 | Di Lella | 214—1 X |
| 3,200,966 | 8/1965 | Peterson et al. | 214—1 |
| 3,250,179 | 5/1966 | Cavagnero | 90—11 |

GIL WEIDENFELD, Primary Examiner

U.S. Cl. X.R.

51—87, 92; 90—11; 144—114, 208; 214—1